US012804384B2

(12) United States Patent
Chen et al.

(10) Patent No.: US 12,804,384 B2
(45) Date of Patent: Nov. 17, 2026

(54) METHOD AND APPARATUS FOR TERMINAL TO OBTAIN ADDRESS OF TARGET APPLICATION SERVER

(71) Applicant: Huawei Technologies Co., Ltd., Shenzhen (CN)

(72) Inventors: Zehao Chen, Shenzhen (CN); Yongcui Li, Shenzhen (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/802,823

(22) Filed: Aug. 13, 2024

(65) Prior Publication Data

US 2024/0406716 A1 Dec. 5, 2024

Related U.S. Application Data

(63) Continuation of application No. PCT/CN2023/075660, filed on Feb. 13, 2023.

(30) Foreign Application Priority Data

Feb. 14, 2022 (CN) ......................... 202210134223.1

(51) Int. Cl.
*H04L 67/51* (2022.01)
*H04W 8/26* (2009.01)
(Continued)

(52) U.S. Cl.
CPC ............... *H04W 8/26* (2013.01); *H04L 67/51* (2022.05); *H04W 48/08* (2013.01); *H04L 61/4511* (2022.05)

(58) Field of Classification Search
None
See application file for complete search history.

(56) References Cited

U.S. PATENT DOCUMENTS

2014/0341085 A1* 11/2014 Suryavanshi ....... H04L 65/1063 370/260
2022/0070113 A1* 3/2022 Caceres .................. H04L 47/70
(Continued)

FOREIGN PATENT DOCUMENTS

CN 113691969 A 11/2021
KR 20220118273 A * 8/2022 ............. H04L 67/51

OTHER PUBLICATIONS

English Translation of KR2022018273a, 37 pages, published Aug. 25, 2022 (Year: 2022).*
(Continued)

*Primary Examiner* — Joshua Joo
(74) *Attorney, Agent, or Firm* — Slater Matsil, LLP

(57) ABSTRACT

This application provides a communication method and apparatus. The method includes: An EASDF receives an identifier of a target service from a first terminal; the EASDF obtains an address of a same target application server that needs to be accessed by a plurality of terminals including the first terminal to access the target service; and the EASDF sends the address of the target application server to the first terminal. Hence, the EASDF obtains, for a same target service, identifiers (referred to as a UE list) of a plurality of UEs that need to access a same EAS. After UE (for example, UE #1) in the UE list performs an EAS discovery procedure for the target service, the EASDF obtains an address of the target EAS, and sends, to another UE in the list, an address of the target EAS that is the same as an address of the UE #1.

20 Claims, 7 Drawing Sheets

(51) Int. Cl.
*H04W 48/08* (2009.01)
*H04L 61/4511* (2022.01)

(56) References Cited

U.S. PATENT DOCUMENTS

| | | | | |
|---|---|---|---|---|
| 2022/0368767 | A1* | 11/2022 | Subramaniam | H04L 67/52 |
| 2022/0418011 | A1* | 12/2022 | Abdelmalek | H04W 64/00 |
| 2023/0079126 | A1* | 3/2023 | Mas Rosique | H04L 61/4511 709/245 |
| 2023/0189187 | A1* | 6/2023 | Velev | H04W 48/16 455/435.1 |
| 2023/0239958 | A1* | 7/2023 | Li | H04W 76/22 |
| 2023/0388788 | A1* | 11/2023 | Kunz | H04W 12/106 |
| 2024/0022541 | A1* | 1/2024 | Lee | H04L 61/4511 |
| 2024/0048526 | A1* | 2/2024 | Lv | H04L 61/4511 |
| 2024/0187374 | A1* | 6/2024 | Tang | H04L 41/085 |
| 2025/0016581 | A1* | 1/2025 | Shen | H04W 8/005 |

OTHER PUBLICATIONS

3GPP TS 23.548 V17.1.0 (Dec. 2021), 3rd Generation Partnership Project, Technical Specification Group Services and System Aspects, 5G System Enhancements for Edge Computing, total 55 pages.

3GPP TSG SA Meeting #SP-94E, SP-211638, Huawei et al.: "New SID on Enhancement of support for Edge Computing in 5G Core network-phase 2", Dec. 14-20, 2021, total 5 pages.

3GPP TSG-SA WG2 Meeting #145e, Lenovo, Motorola Mobility: "SMF selecting an EAS application server by taking into account NWDAF analytics", May 17-May 28, 2021, eMeeting, S2-2104614, total 7 pages.

3GPP TS 23.548 V17.0.0 (Dec. 2021), "3rd Generation Partnership Project; Technical Specification Group Services and System Aspects; 5G System Enhancements for Edge Computing; Stage 2 (Release 17)", Technical Specification, total 52 pages.

* cited by examiner

METHOD AND APPARATUS FOR TERMINAL TO OBTAIN ADDRESS OF TARGET APPLICATION SERVER

CROSS-REFERENCE TO RELATED APPLICATIONS

This application is a continuation of International Application No. PCT/CN2023/075660, filed on Feb. 13, 2023, which claims priority to Chinese Patent Application No. 202210134223.1, filed on Feb. 14, 2022. The disclosures of the aforementioned applications are hereby incorporated by reference in their entireties.

TECHNICAL FIELD

This application relates to the field of communication technologies, and more specifically, to a communication method and apparatus.

BACKGROUND

In a conventional mobile network architecture, a user plane device is usually deployed according to a tree topology. With the explosive growth of mobile service traffic, this deployment mode becomes increasingly difficult to support this fast-growing mobile service traffic model. Based on the preceding background, a concept of edge computing (EC) is proposed in the industry. In an EC deployment scenario, some services may be provided by a plurality of application servers deployed at a network edge. When a terminal needs to access a service, the EC scenario requires the terminal to access an available application server closest to the terminal. Therefore, the terminal needs to obtain an address of an appropriate application server. However, in existing standards, a scenario in which a plurality of terminals access a same application server is not considered.

SUMMARY

According to a first aspect, a communication method is provided. The method includes:

An application server discovery network element receives an identifier of a target service from a first terminal. The application server discovery network element obtains an address of a same target application server that needs to be accessed by a plurality of terminals to access the target service, where the plurality of terminals include the first terminal. The application server discovery network element sends the address of the target application server to the first terminal.

With reference to the first aspect, in some implementations of the first aspect, that the application server discovery network element obtains an address of a target application server includes:

The application server discovery network element obtains first information or an address of a local domain name system server from a session management network element based on an identifier of the first terminal and the identifier of the target service, where the first information is used to determine an extension mechanisms for domain name system client subnet option, or the first information is an extension mechanisms for domain name system client subnet option.

The application server discovery network element obtains the address of the target application server based on the first information or the address of the local domain name system server.

With reference to the first aspect, in some implementations of the first aspect, the method further includes:

The application server discovery network element stores the address of the target application server that needs to be accessed by the plurality of terminals to access the target service.

With reference to the first aspect, in some implementations of the first aspect, that the application server discovery network element obtains an address of a target application server includes:

The application server discovery network element obtains the address of the target application server locally based on the identifier of the first terminal and the identifier of the target service.

With reference to the first aspect, in some implementations of the first aspect, that the application server discovery network element obtains an address of a target application server includes:

The application server discovery network element obtains first information or an address of a local domain name system server from a session management network element, where the first information is used to determine an extension mechanisms for domain name system client subnet option, or the first information is an extension mechanisms for domain name system client subnet option.

The application server discovery network element obtains the address of the target application server based on the first information or the address of the local domain name system server.

With reference to the first aspect, in some implementations of the first aspect, after the application server discovery network element obtains the address of the target application server, the method further includes:

The application server discovery network element sends the address of the target application server to a first network element.

With reference to the first aspect, in some implementations of the first aspect, the first information or the address of the local domain name system server is determined based on locations of the plurality of terminals.

With reference to the first aspect, in some implementations of the first aspect, that the application server discovery network element obtains an address of a target application server includes:

The application server discovery network element receives the address of the target application server from the first network element.

With reference to the first aspect, in some implementations of the first aspect, before the application server discovery network element obtains the address of the target application server, the method further includes:

The application server discovery network element queries the first network element about the address of the target application server that needs to be accessed by the plurality of terminals to access the target service.

With reference to the first aspect, in some implementations of the first aspect, the method further includes:

The application server discovery network element receives identifiers of the plurality of terminals and the identifier of the target service from an application function network element.

With reference to the first aspect, in some implementations of the first aspect, the method further includes:

The application server discovery network element receives one or more of the following from the application function network element:

the access time points, access locations, and access manners of accessing a same application server by the plurality of terminals when the plurality of terminals execute the target service.

With reference to the first aspect, in some implementations of the first aspect, the first network element is any one of the following network elements:

a unified data management network element, a unified data storage network element, a network exposure network element, a network storage function network element, a policy control network element, and a network data analytics network element.

According to a second aspect, a communication method is provided. The method includes:

An application function network element determines, for a target service, a plurality of terminals that need to access a same application server. The application function network element sends an identifier of the target service and identifiers of the plurality of terminals.

With reference to the second aspect, in some implementations of the second aspect, the method further includes:

The application function network element sends a constraint condition for accessing the same application server by the plurality of terminals when the plurality of terminals access the target service, where the constraint condition includes one or more of the following:

access time points, access locations, and access manners.

With reference to the second aspect, in some implementations of the second aspect, the method further includes:

The application function network element determines that another terminal other than the plurality of terminals needs to, for the target service, access the same application server as the plurality of terminals; and the application function network element sends an identifier of the another terminal.

According to a third aspect, a communication method is provided. The method includes:

A session management network element obtains identifiers of a plurality of terminals, where the plurality of terminals need to access a same application server when accessing a target service; the session management network element obtains location information of the plurality of terminals based on the identifiers of the plurality of terminals; the session management network element determines first information or an address of a local domain name system server based on the location information of the plurality of terminals, where the first information is used to determine an extension mechanisms for domain name system client subnet option, or the first information is an extension mechanisms for domain name system client subnet option; and the session management network element sends the first information or the address of the local domain name system server to an application server discovery network element.

With reference to the third aspect, in some implementations of the third aspect, that the session management network element obtains location information of the plurality of terminals based on the identifiers of the plurality of terminals includes:

The session management network element obtains the location information of the plurality of terminals from a mobility management network element and/or a location management network element.

According to a fourth aspect, a communication method is provided. The method includes:

A session management network element obtains an identifier of a target service and identifiers of a plurality of terminals, where the plurality of terminals need to access a same application server to execute the target service. After performing a discovery procedure of a target application server, the session management network element obtains an identifier of another terminal other than the plurality of terminals, where the another terminal and the plurality of terminals need to access the same application server to execute the target service, and the target application server is the same application server to be accessed by the plurality of terminals to execute the target service. The session management network element determines that the target application server is unsuitable to serve as the same application server to be accessed by the another terminal and the plurality of terminals to access the target service. The session management network element sends an application server rediscovery request message to the terminals.

In addition, in another case, an application function network element determines that for the target service, at least one terminal in the plurality of terminals does not need to access the same application server as remaining terminals in the plurality of terminals. The application function network element sends an identifier of the at least one terminal. The session management network element determines that the target application server is unsuitable to serve as the same application server to be accessed by the remaining terminals to access the target service. The session management network element sends the application server rediscovery request message to the terminals.

According to a fifth aspect, a communication method is provided. The method includes:

A session management network element obtains an identifier of a target service and identifiers of a plurality of terminals, where the plurality of terminals need to access a same application server to execute the target service. After performing a discovery procedure of a target application server, the session management network element determines that a location of at least one terminal in the plurality of terminals changes, where the target application server is, before the location of the at least one terminal changes, the same application server to be accessed by the plurality of terminals to access the target service. The session management network element determines that the target application server is unsuitable to serve, after the location of the at least one terminal changes, as the same application server to be accessed by the plurality of terminals to access the target service. The session management network element sends an application server rediscovery request message to the terminals.

According to a sixth aspect, a communication method is provided. The method includes:

A first network element receives a query message from a session management network element, where the query message is used to query an address of a same target application server that needs to be accessed by a plurality of terminals to access a target service. The first network element sends feedback information to the session management network element, where the feedback information is used to trigger sending of first information or an address of a local domain name system server by the session management network element to an application server discovery network element, and the first information is used to determine an extension mechanisms for domain name system client subnet option, or the first information is an extension mechanisms for domain name system client subnet option; or the first network element sends the address of the target application server to the session management network element.

With reference to the sixth aspect, in some implementations of the sixth aspect, the method further includes:

The first network element stores the address of the target application server that needs to be accessed by the plurality of terminals to access the target service.

With reference to the sixth aspect, in some implementations of the sixth aspect, the first network element is any one of the following network elements:

a unified data management network element, a unified data storage network element, a network exposure network element, a network storage function network element, a policy control network element, and a network data analytics network element.

According to a seventh aspect, a communication method is provided. The method includes:

A first network element obtains first information, where the first information indicates that for a target service, a first terminal and a second terminal need to access a same application server; the first network element obtains an address of a target application server, where the target application server is an application server to be accessed by the first terminal to access the target service. The first network element sends the address of the target application server to the second terminal based on the first information.

With reference to the seventh aspect, in some implementations of the seventh aspect, that the first network element obtains an address of a target application server includes:

The first network element obtains a first relationship, where the first relationship includes the address of the target application server, and the first relationship is a correspondence among an identifier of the first terminal, an identifier of the target service, and the address of the target application server.

The method further includes:

The first network element determines, based on the first information and the first relationship, that the second terminal and the target service correspond to the target application server.

With reference to the seventh aspect, in some implementations of the seventh aspect, the method further includes:

The first network element determines a second relationship based on the first relationship and the first information, where the second relationship is a correspondence among an identifier of the second terminal, the identifier of the target service, and the address of the target application server.

With reference to the seventh aspect, in some implementations of the seventh aspect, that a first network element obtains first information includes:

The first network element obtains the first information from the second terminal or an application server discovery network element.

With reference to the seventh aspect, in some implementations of the seventh aspect, the method further includes:

The first network element receives a notification message from the application server discovery network element, where the notification message includes the identifier of the second terminal and the identifier of the target service.

With reference to the seventh aspect, in some implementations of the seventh aspect, the method further includes:

The first network element sends the address of the target application server to the second terminal, and the method includes:

The first network element sends the address of the target application server to the second terminal through the application server discovery network element.

With reference to the seventh aspect, in some implementations of the seventh aspect, the first network element is a session management network element.

With reference to the seventh aspect, in some implementations of the seventh aspect, that a first network element obtains first information includes:

The first network element obtains the first information from a session management network element or the second terminal.

With reference to the seventh aspect, in some implementations of the seventh aspect, the method further includes:

The first network element receives a query message from the second terminal, where the query message includes the identifier of the target service.

With reference to the seventh aspect, in some implementations of the seventh aspect, the first network element is an application server discovery network element.

According to an eighth aspect, a communication method is provided. The method includes:

A session management network element obtains an address of a target application server, where the target application server is an application server to be accessed by a first terminal to access a target service. The session management network element obtains first information, where the first information indicates that for the target service, the first terminal and a second terminal need to access a same application server. The session management network element determines a first relationship based on the first information, where the first relationship is a correspondence between an identifier of the second terminal, an identifier of the target service, and the address of the target application server. The session management network element sends the first relationship to an application server discovery network element.

With reference to the eighth aspect, in some implementations of the eighth aspect, that the session management network element obtains an address of a target application server includes:

The session management network element obtains a second relationship, where the second relationship includes the address of the target application server, and the second relationship is a correspondence among an identifier of the first terminal, the identifier of the target service, and the address of the target application server.

With reference to the eighth aspect, in some implementations of the eighth aspect, that the session management network element obtains first information includes:

The session management network element obtains the first information from the second terminal.

According to a ninth aspect, a communication apparatus is provided. The apparatus includes a transceiver unit and a processing unit connected to the transceiver unit.

The transceiver unit is configured to receive an identifier of a target service from a first terminal; the transceiver unit is configured to obtain an address of a same target application server that needs to be accessed by a plurality of terminals to access the target service, where the plurality of terminals include the first terminal; and the transceiver unit is configured to send the address of the target application server to the first terminal.

With reference to the ninth aspect, in some implementations of the ninth aspect, the transceiver unit is configured to obtain first information or an address of a local domain name system server from a session management network element based on an identifier of the first terminal and the identifier of the target service, where the first information is used to determine an extension mechanisms for domain name system client subnet option, or the first information is an extension mechanisms for domain name system client subnet option.

The transceiver unit is configured to obtain the address of the target application server based on the first information or the address of the local domain name system server.

With reference to the ninth aspect, in some implementations of the ninth aspect, the method further includes:

The processing unit is configured to store the address of the target application server that needs to be accessed by the plurality of terminals to access the target service.

With reference to the ninth aspect, in some implementations of the ninth aspect, the transceiver unit is configured to obtain the address of the target application server locally based on the identifier of the first terminal and the identifier of the target service.

With reference to the ninth aspect, in some implementations of the ninth aspect, the transceiver unit is configured to obtain first information or an address of a local domain name system server from a session management network element, where the first information is used to determine an extension mechanisms for domain name system client subnet option, or the first information is an extension mechanisms for domain name system client subnet option.

The transceiver unit is configured to obtain the address of the target application server based on the first information or the address of the local domain name system server.

With reference to the ninth aspect, in some implementations of the ninth aspect, the transceiver unit is configured to send the address of the target application server to a first network element.

With reference to the ninth aspect, in some implementations of the ninth aspect, the first information or the address of the local domain name system server is determined based on locations of the plurality of terminals.

With reference to the ninth aspect, in some implementations of the ninth aspect, the transceiver unit is configured to receive the address of the target application server from the first network element.

With reference to the ninth aspect, in some implementations of the ninth aspect, the transceiver unit is configured to query the first network element about the address of the target application server that needs to be accessed by the plurality of terminals to access the target service.

With reference to the ninth aspect, in some implementations of the ninth aspect, the transceiver unit is configured to receive identifiers of the plurality of terminals and the identifier of the target service from an application function network element.

With reference to the ninth aspect, in some implementations of the ninth aspect, the transceiver unit is configured to receive one or more of the following from the application function network element:

access time points, access locations, and access manners of accessing the same application server by the plurality of terminals when the plurality of terminals execute the target service.

With reference to the ninth aspect, in some implementations of the ninth aspect, the first network element is any one of the following network elements:

- a unified data management network element, a unified data storage network element, a network exposure network element, a network storage function network element, a policy control network element, and a network data analytics network element.

According to a tenth aspect, a communication apparatus is provided. The apparatus includes a transceiver unit and a processing unit connected to the transceiver unit.

The processing unit is configured to determine, for a target service, a plurality of terminals that need to access a same application server; and the transceiver unit is configured to send an identifier of the target service and identifiers of the plurality of terminals.

With reference to the tenth aspect, in some implementations of the tenth aspect, the transceiver unit is configured to send a constraint condition for accessing the same application server by the plurality of terminals when the plurality of terminals access the target service, where the constraint condition includes one or more of the following:

access time points, access locations, and access manners.

With reference to the tenth aspect, in some implementations of the tenth aspect, the processing unit is configured to determine that another terminal other than the plurality of terminals needs to, for the target service, access the same application server as the plurality of terminals; and the transceiver unit is configured to send an identifier of the another terminal.

According to an eleventh aspect, a communication apparatus is provided. The apparatus includes a transceiver unit and a processing unit connected to the transceiver unit.

The transceiver unit is configured to obtain identifiers of a plurality of terminals, where the plurality of terminals need to access a same application server when accessing a target service. The transceiver unit is configured to obtain location information of the plurality of terminals based on the identifiers of the plurality of terminals. The processing unit is configured to determine first information or an address of a local domain name system server based on the location information of the plurality of terminals, where the first information is used to determine an extension mechanisms for domain name system client subnet option, or the first information is an extension mechanisms for domain name system client subnet option. The transceiver unit is configured to send the first information or the address of the local domain name system server to an application server discovery network element.

With reference to the eleventh aspect, in some implementations of the eleventh aspect, the transceiver unit is configured to obtain location information of the plurality of terminals from a mobility management network element and/or a location management network element.

According to a twelfth aspect, a communication apparatus is provided. The apparatus includes a transceiver unit and a processing unit connected to the transceiver unit.

The transceiver unit is configured to obtain an identifier of a target service and identifiers of a plurality of terminals, where the plurality of terminals need to access a same application server to execute the target service. After performing a discovery procedure of a target application server, the transceiver unit is configured to obtain an identifier of another terminal other than the plurality of terminals, where the another terminal and the plurality of terminals need to access the same application server to execute the target service, and the target application server is the same application server to be accessed by the plurality of terminals to execute the target service. The processing unit is configured to determine that the target application server is unsuitable to serve as the same application server to be accessed by the another terminal and the plurality of terminals to access the target service. The transceiver unit is configured to send an application server rediscovery request message to the terminals.

According to a thirteenth aspect, a communication apparatus is provided. The apparatus includes a transceiver unit and a processing unit connected to the transceiver unit.

The transceiver unit is configured to obtain an identifier of a target service and identifiers of a plurality of terminals, where the plurality of terminals need to access a same application server to execute the target service. After performing a discovery procedure of a target application server, the processing unit is configured to determine that a location of at least one terminal in the plurality of terminals changes, where the target application server is, before the location of the at least one terminal changes, the same application server to be accessed by the plurality of terminals to access the target service. The processing unit is configured to determine that the target application server is unsuitable to serve, after the location of the at least one terminal changes, as the same application server to be accessed by the plurality of terminals to access the target service. The transceiver unit is configured to send an application server rediscovery request message to the terminals.

According to a fourteenth aspect, a communication apparatus is provided. The apparatus includes a transceiver unit and a processing unit connected to the transceiver unit.

The transceiver unit is configured to receive a query message from a session management network element, where the query message is used to query an address of a same target application server that needs to be accessed by a plurality of terminals to access a target service. The transceiver unit is configured to send feedback information to the session management network element, where the feedback information is used to trigger sending of first information or an address of a local domain name system server by the session management network element to an application server discovery network element, and the first information is used to determine an extension mechanisms for domain name system client subnet option, or the first information is an extension mechanisms for domain name system client subnet option; or the transceiver unit is configured to send the address of the target application server to the session management network element.

With reference to the fourteenth aspect, in some implementations of the fourteenth aspect, the processing unit is configured to store the address of the target application server that needs to be accessed by the plurality of terminals to access the target service.

With reference to the fourteenth aspect, in some implementations of the fourteenth aspect, the first network element is any one of the following network elements:

a unified data management network element, a unified data storage network element, a network exposure network element, a network storage function network element, a policy control network element, and a network data analytics network element.

According to a fifteenth aspect, a communication apparatus is provided. The apparatus includes a transceiver unit and a processing unit connected to the transceiver unit.

The transceiver unit is configured to obtain first information, where the first information indicates that for a target service, a first terminal and a second terminal need to access a same application server. The transceiver unit is configured to obtain an address of a target application server, where the target application server is an application server to be accessed by the first terminal to access the target service. The transceiver unit is configured to send the address of the target application server to the second terminal based on the first information.

With reference to the fifteenth aspect, in some implementations of the fifteenth aspect, the transceiver unit is configured to obtain a first relationship, where the first relationship includes the address of the target application server, and the first relationship is a correspondence among an identifier of the first terminal, an identifier of the target service, and the address of the target application server.

The processing unit is configured to determine, based on the first information and the first relationship, that the second terminal and the target service correspond to the target application server.

With reference to the fifteenth aspect, in some implementations of the fifteenth aspect, the processing unit is configured to determine a second relationship based on the first relationship and the first information, where the second relationship is a correspondence among an identifier of the second terminal, the identifier of the target service, and the address of the target application server.

With reference to the fifteenth aspect, in some implementations of the fifteenth aspect, the transceiver unit is configured to obtain the first information from the second terminal or an application server discovery network element.

With reference to the fifteenth aspect, in some implementations of the fifteenth aspect, the transceiver unit is configured to receive a notification message from the application server discovery network element, where the notification message includes the identifier of the second terminal and the identifier of the target service.

With reference to the fifteenth aspect, in some implementations of the fifteenth aspect, the transceiver unit is configured to send the address of the target application server to the second terminal through the application server discovery network element.

With reference to the fifteenth aspect, in some implementations of the fifteenth aspect, the first network element is a session management network element.

With reference to the fifteenth aspect, in some implementations of the fifteenth aspect, the transceiver unit is configured to obtain the first information from a session management network element or the second terminal.

With reference to the fifteenth aspect, in some implementations of the fifteenth aspect, the transceiver unit is configured to receive a query message from the second terminal, where the query message includes the identifier of the target service.

With reference to the fifteenth aspect, in some implementations of the fifteenth aspect, the first network element is an application server discovery network element.

According to a sixteenth aspect, a communication apparatus is provided. The apparatus includes a transceiver unit and a processing unit connected to the transceiver unit.

The transceiver unit is configured to obtain an address of a target application server, where the target application server is an application server to be accessed by a first terminal to access a target service. The transceiver unit is configured to obtain first information, where the first information indicates that for the target service, the first terminal and a second terminal need to access a same application server. The processing unit is configured to determine a first relationship based on the first information, where the first relationship is a correspondence between an identifier of the second terminal, an identifier of the target service, and the address of the target application server. The transceiver unit is configured to send the first relationship to an application server discovery network element.

With reference to the sixteenth aspect, in some implementations of the sixteenth aspect, the transceiver unit is configured to obtain a second relationship, where the second relationship includes the address of the target application server, and the second relationship is a correspondence among an identifier of the first terminal, the identifier of the target service, and the address of the target application server.

With reference to the sixteenth aspect, in some implementations of the sixteenth aspect, the transceiver unit is configured to obtain the first information from the second terminal.

According to a seventeenth aspect, a communication device is provided. The communication device includes a communication interface and a processor. When the communication device runs, the processor executes a computer program or instructions stored in a memory, so that the communication device performs the method according to any possible implementation in the first aspect to the eighth aspect. The memory may be located in the processor, or may be implemented by using a chip independent of the processor. This is not specifically limited in this application.

According to an eighteenth aspect, a computer-readable storage medium is provided. The computer-readable storage medium includes a computer program. When the computer program is run on a computer, the computer is enabled to perform the method according to any possible implementation in the first aspect to the eighth aspect.

According to a nineteenth aspect, a chip or a chip system is provided. The chip or the chip system includes a processing circuit, where the processing circuit is configured to perform the method according to any possible implementation in the first aspect to the eighth aspect.

According to a twentieth aspect, a computer program product is provided. The computer program product includes: a computer program (or may be referred to as code or instructions). When the computer program is run, the computer is enabled to perform the method according to any possible implementation in the first aspect to the eighth aspect.

According to a twenty-first aspect, a communication apparatus is provided. The communication apparatus includes: a memory, configured to store computer instructions; and a processor, configured to execute the computer instructions, so that the communication apparatus performs the method according to any possible implementation in the first aspect to the eighth aspect.

DETAILED DESCRIPTION OF ILLUSTRATIVE EMBODIMENTS

Technical solutions in embodiments of this application may be applied to various 3rd generation partnership project (3GPP) communication systems, for example, a long term evolution (LTE) system, an LTE frequency division duplex (FDD) system, an LTE time division duplex (TDD) system, a 5th generation (5G) communication system, also referred to as a new radio (NR) communication system, and a future evolved communication system such as a 6th generation (6G) communication system.

Figure 1:
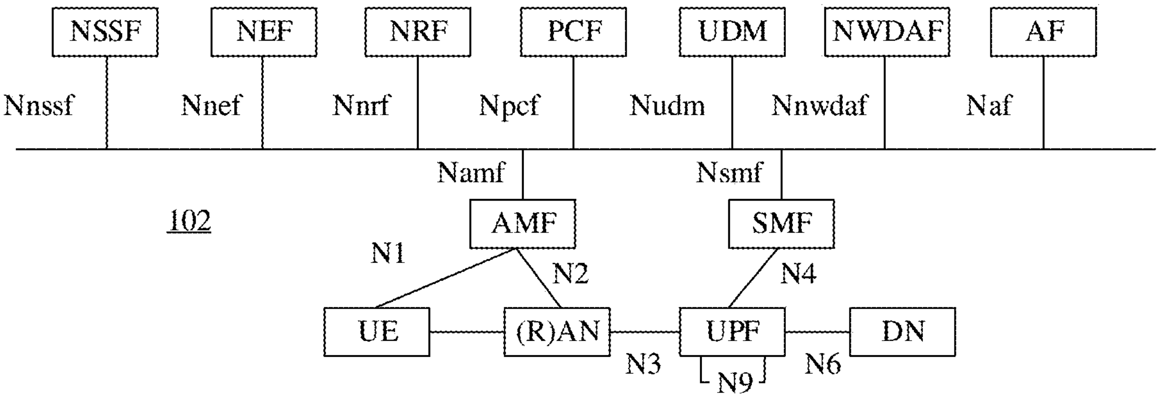
FIG. 1 shows a system architecture applicable to an embodiment of this application.

FIG. 1 is a schematic diagram of a communication network architecture. The network architecture may specifically include the following network elements:

1. User equipment (UE) may include various handheld devices with a wireless communication function, vehicle-mounted devices, wearable devices, computing devices, or other processing devices connected to a wireless modem, and various forms of terminals, mobile stations (MSs), terminals, soft clients, or the like. For example, a water meter, an electricity meter, or a sensor.

2. A (radio) access network ((R)AN) device is configured to provide a network access function for authorized user equipment in a specific area, and can use transmission tunnels of different quality based on user equipment levels, service requirements, or the like.

The RAN can manage a radio resource and provide an access service to user equipment, to complete forwarding of a control signal and user equipment data between the user equipment and a core network. The RAN may also be understood as a base station in a conventional network.

3. A user plane function (UPF) network element is configured to perform packet routing and forwarding, quality of service (QOS) processing of user plane data, and the like. User data may be accessed to a data network (DN) through this network element. In embodiments of this application, the user plane function network element may be configured to implement functions of a user plane network element.

4. A data network (DN) is configured to provide a network for data transmission, for example, an operator service network, the Internet, and a third-party service network.

5. An authentication server function (AUSF) network element is mainly configured for user authentication and the like.

6. An access and mobility management function (AMF) network element is mainly configured for mobility management, access management, and the like, and may further be configured to implement a function other than session management in functions of a mobility management entity (MME), for example, a function of access authorization/authentication.

7. A session management function (SMF) network element is mainly configured for session management, allocation and management of internet protocol (IP) addresses of terminal devices, selection and management of a user plane function, a termination point of a policy control and charging function interface, downlink data notification, and the like.

8. A policy control function (PCF) network element is a unified policy framework configured to guide network behavior and provide policy rule information for a network network element (for example, an AMF network element or an SMF network element) or a terminal device.

9. A network repository function (NRF) network element is configured to store description information of a network function entity and a service provided by the network function entity, and support service discovery, network element entity discovery, and the like.

10. A network exposure function (NEF) network element is mainly configured to securely expose, to the outside, a service, a capability, and the like that are provided by a 3rd generation partnership project (3GPP) network function.

11. A unified data management (UDM) network element is configured for unified data management, 5G user data management, user identifier processing, access authentication, registration, mobility management, or the like.

12. An application function (AF) network element is configured to route data affected by an application, access a network exposure function network element, interact with a policy framework to perform policy control, or the like.

13. Network data analytics function (NWDAF) network element: The NWDAF may have at least one of the following functions:

data collection, model training, model feedback, analysis result inference, and analysis result feedback. The data collection function refers to collecting data from a network network element, a third-party server, a terminal device, or a network management system. The model training function refers to performing analysis and training based on related input data to obtain a model. The model feedback function refers to sending a trained machine learning model to a network element that supports an inference function. The analysis result inference function determines a data analysis result based on the trained machine learning model and the inference data. The analysis result feedback function may provide a data analysis result for a network network element, a third-party server, a terminal device, or a network management system. The data analysis result may assist a network in selecting a quality of service parameter of a service, assist a network in performing traffic routing, assist a network in selecting a background traffic transmission policy, or the like.

In the foregoing network architecture, an N2 interface is an interface between a RAN and an AMF network element, and is configured to send a radio parameter, non-access stratum (NAS) signaling, and the like. An N3 interface is an interface between a RAN and a UPF network element, and is configured to transmit user plane data and the like. An N4 interface is an interface between an SMF network element and a UPF network element, and is configured to transmit information such as a service policy, tunnel identifier information of an N3 connection, data buffer indication information, and a downlink data notification message. An N6 interface is an interface between a DN network element and a UPF network element, and is configured to transmit user plane data and the like.

The following describes the technical solutions of embodiments in this application with reference to accompanying drawings.

First, a first solution provided in this application is described.

An EASDF receives an identifier of a target service from a first terminal; the EASDF obtains an address of a same target EAS that needs to be accessed by a plurality of terminals to access the target service, where the plurality of terminals include the first terminal; and the EASDF sends the address of the target EAS to the first terminal.

Figure 2:
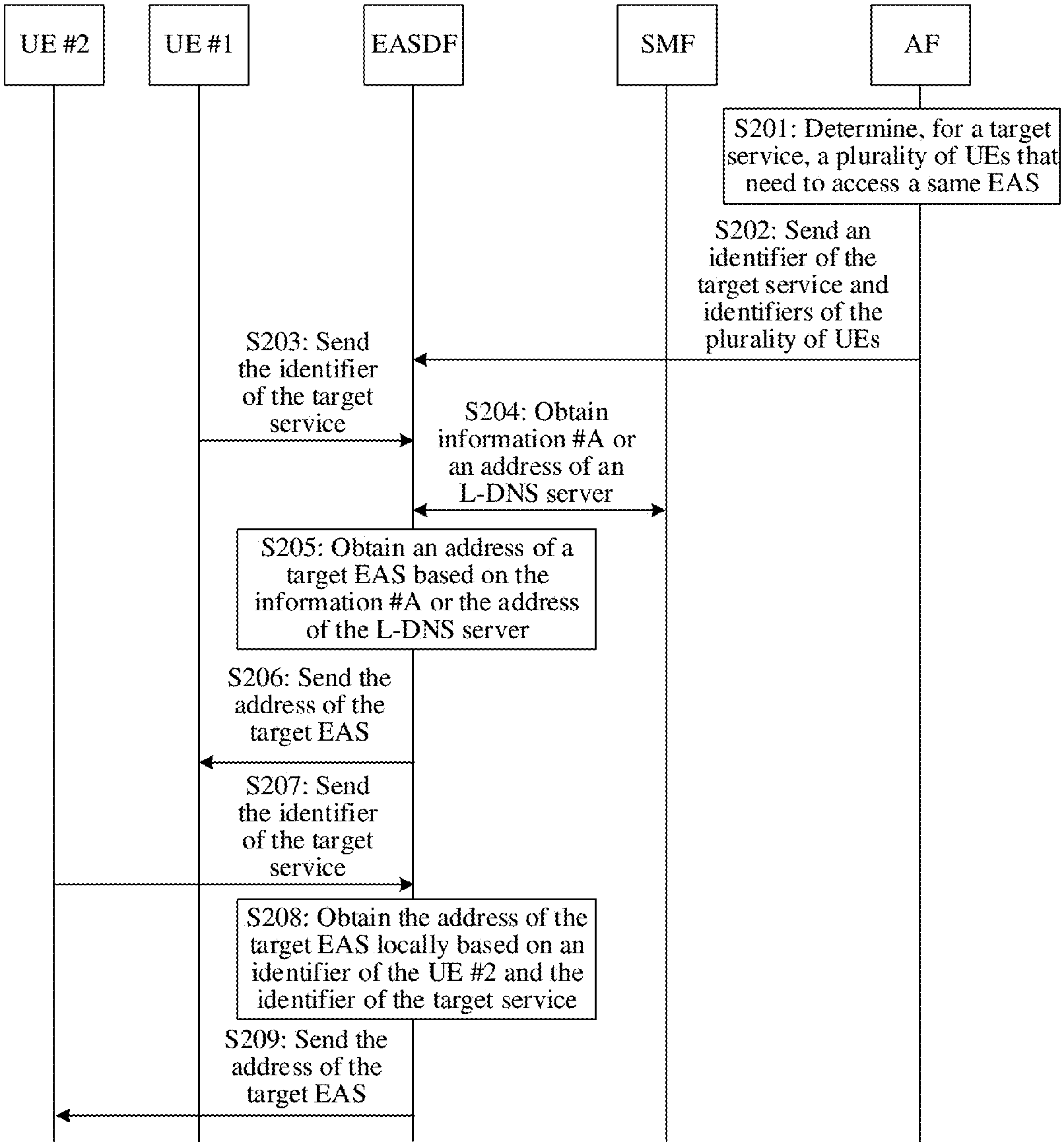
FIG. 2 is a schematic interaction diagram of a method according to this application.
Figure 3:
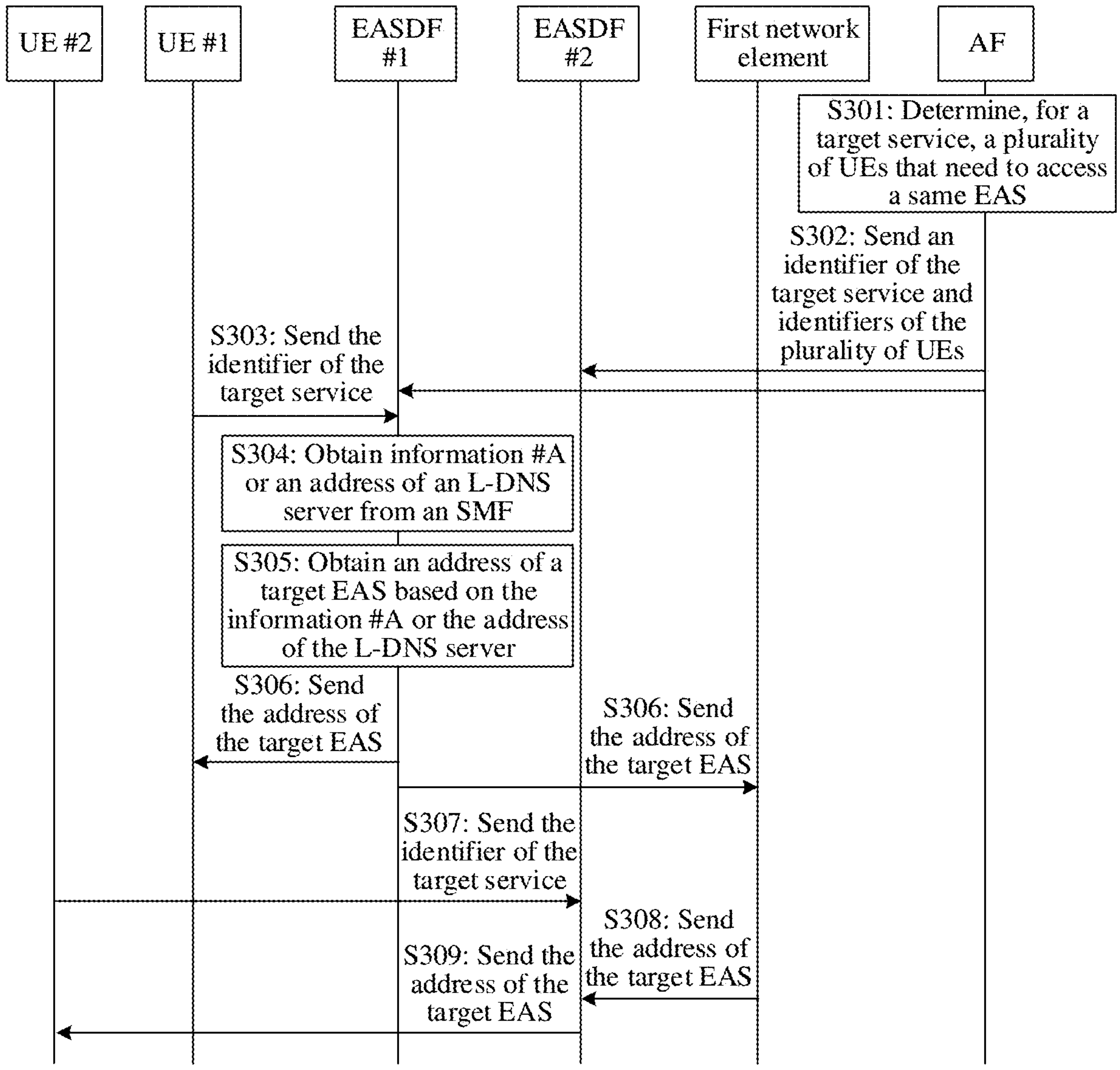
FIG. 3 is a schematic interaction diagram of a method according to this application.

The following describes the first solution in detail with reference to FIG. 2 and FIG. 3.

FIG. 2 shows a method according to this application. The method includes the following steps.

S201: An AF determines, for a target service, a plurality of UEs that need to access a same EAS.

For example, if the target service is a video conference, and the AF determines that UE #1, UE #2, and UE #3 need to join the video conference, the AF determines that the UE #1, the UE #2, and the UE #3 need to access a same EAS to join the video conference.

For example, if the target service is a game #A, and the AF determines that UE #1, UE #2, and UE #3 need to team up to play the game #A, the AF determines that the UE #1, the UE #2, and the UE #3 need to access a same EAS to play the game #A.

S202: The AF sends an identifier of the target service and identifiers of the plurality of UEs. Correspondingly, the EASDF receives the identifiers of the plurality of UEs and the identifier of the target service from the AF.

For example, the identifier of the target service may be a fully qualified domain name (fully qualified domain name, FQDN), or may be an application identifier (App ID), or may be another information element that can identify the target service. This is not limited.

For example, the identifiers of the plurality of UEs may be described as a UE list (list) or a UE set (set/collection), that is, the UE list/set includes the identifiers of the plurality of UEs. Alternatively, the UE list/set includes a plurality of identifiers, and each identifier corresponds to one UE in the plurality of UEs.

In another possibility, the identifiers of the plurality of UEs may also be one identifier, that is, the plurality of UEs are represented by one identifier. The identifier is a common identifier of the plurality of UEs or the UE list/set.

In this application, an identifier of UE may be an external identifier (for example, a generic public subscription identifier (GPSI)), or may be an internal identifier (for example, a subscription permanent identifier (SUPI)), or may be an address (for example, an IP address or a MAC address) of the UE, or may be another information element that identifies the UE. This is not limited.

The foregoing descriptions about the identifiers of the plurality of UEs are applicable to all embodiments of this application, and details are not described below again.

Optionally, the AF may further send another constraint condition for accessing the same application server by the plurality of UEs when the plurality of UEs execute the target service, where the another constraint condition includes one or more of the following:

access time points, access locations, and access manners.

For ease of description, the information sent by the AF is denoted as information #1. That is, the information #1 includes the identifier of the target service and the identifiers of the plurality of UEs, and optionally, further includes the foregoing another constraint condition.

The following uses several examples to describe a manner in which the EASDF receives the information #1.

Example 1

Step 1: The AF sends the information #1 to a UDM/UDR. Correspondingly, the UDM/UDR receives the information #1.

For example, the AF sends an AF request (AF request) message to the UDM, where the AF request message includes the information #1.

Step 2: UE #1 initiates a protocol data unit (protocol data unit, PDU) session establishment procedure, and sends a PDU session establishment request message to an SMF. Correspondingly, the SMF receives the PDU session establishment request message.

Step 3: The SMF obtains the information #1 from the UDM.

For example, the SMF may send an Nudm_SDM_Get Request message to the UDM. The UDM may send an Nudm_SDM_Get Response message to the SMF, where the message includes the information #1.

Step 4: The SMF sends the information #1 to the EASDF. Correspondingly, the EASDF receives the information #1.

For example, the SMF may send an Neasdf_BaselineDNSPattern_Create message to the EASDF, where the message includes the information #1.

Example 2

Step 1: The AF sends the information #1 to a PCF. Correspondingly, the PCF receives the information #1.

Step 2: The PCF sends the information #1 to the SMF. Correspondingly, the SMF receives the information #1.

For example, the PCF may send an Npcf_SMPolicyControl message to the SMF, where the message includes the information #1.

Step 3: The SMF sends the information #1 to the EASDF. Correspondingly, the EASDF receives the information #1.

Example 3

The AF indicates an application server (AS) to send the information #1 to the EASDF through a user plane path. For example, the AS constructs a downlink data packet, where the downlink data packet includes the information #1.

S203: The UE #1 sends the identifier of the target service to the EASDF. Correspondingly, the EASDF receives the identifier of the target service from the UE #1.

For example, the UE #1 may send a domain name system query (DNS query) message #1 to the EASDF, where the DNS query message #1 includes the identifier of the target service. The DNS query message #1 is used to query an application server that needs, for the target service, to be accessed by the UE #1.

S204: The EASDF obtains information #A or an address of a local domain name system (local DNS, L-DNS) server from the SMF based on an identifier of the UE #1 and the identifier of the target service.

The information #A is used to determine an extension mechanisms for domain name system client subnet option (ECS option), or it may be described as that the information #A is an ECS option. For the information #A, details are not described below again.

Specifically, the process further includes the following step a to step e:

Step a: After receiving the DNS query message #1, the EASDF matches the identifier of the UE #1 with the identifiers of the plurality of UEs in the information #1, and matches the identifier of the target service in the DNS query message #1 with the identifier of the target service in the information #1. Further, the EASDF determines that the plurality of UEs include the UE #1, and the identifier of the target service in the DNS query message #1 is the same as the identifier of the target service in the information #1.

A manner in which the EASDF matches the identifier of the UE #1 with the identifiers of the plurality of UEs in the information #1 is not limited in this application. For example, if the identifiers of the plurality of UEs in the information #1 include the identifier of the UE #1, it is considered that the matching is successful. A manner in which the EASDF matches the identifier of the target service in the DNS query message #1 with the identifier of the target service in the information #1 is not limited in this application. For example, if the identifier of the target service in the DNS query message #1 is the same as the identifier of the target service in the information #1, it is considered that the matching is successful.

Optionally, the information #1 includes the foregoing another constraint condition. When the foregoing another constraint condition is included, the EASDF may further match each item in the foregoing another constraint condition with the DNS query message #1. A manner in which the EASDF matches the another constraint condition with the DNS query message #1 is not limited in this application.

For example, if the foregoing constraint condition includes an access time window, the EASDF may further determine that if a time point at which the DNS query message #1 is received is within the access time window, it is considered that the matching is successful. For example, if the foregoing constraint condition includes an access location (for example, may be a location of UE, and may be represented by one or more of following: a geographic location, a cell ID, a tracking area (TA) ID, and a data network access identifier (DNAI)), the EASDF may further determine that if a location of the UE #1 is within the access location, it is considered that the matching is successful. For example, if the foregoing constraint condition includes an access manner (for example, access by using a 3GPP network), the EASDF may further determine that if the UE #1 accesses, by using a 3GPP network, a session in which the DNS query message #1 is sent, it is considered that the matching is successful.

Step b: Based on a case in which the foregoing matching is successful (all items in step a are successfully matched), the EASDF determines whether to perform a discovery procedure of the same application server that needs to be accessed by the plurality of UEs to access the target service, or it may be described as that the EASDF determines whether an address of the same EAS that needs to be accessed by the plurality of UEs to access the target service can be determined successfully.

If the UE #1 is the first UE in the plurality of UEs to initiate a DNS query to the EASDF, a result of the determining is no. That is, in this case, the EASDF has yet to locally store the address of the target EAS corresponding to the plurality of UEs and the target service, or it may be described as that the EASDF cannot successfully determine the address of the same EAS that needs to be accessed by the plurality of UEs to access the target service.

Step c: If the result of the determining in step b is no, the EASDF sends a message #A to the SMF, where the message #A includes the identifier of the UE #1 and the identifier of the target service.

For example, the message #A is an Neasdf_DNSContext_Notify Request message.

Step d: The SMF determines the information #A or the address of the L-DNS server.

Manner 1

The SMF may determine the information #A or the address of the L-DNS server based on the location of the UE #1.

Manner 2

The SMF may determine the information #A or the address of the L-DNS server based on locations of the plurality of UEs.

It should be understood that the SMF may obtain location information of the plurality of UEs from an AMF and/or an LMF.

For example, the information #A or the address of the L-DNS server may be determined based on an average location of the plurality of UEs.

For example, if most UEs in the plurality of UEs are located in a same area, the information #A or the address of the L-DNS server may be determined based on locations of the most UEs.

For example, the plurality of UEs are UE #1 to UE #5, where the UE #1 to the UE #4 are located in an area #A, and the UE #5 is located in an area #B. In this case, the information #A or the address of the L-DNS server may be determined based on locations of the UE #1 to the UE #4.

Step e: The SMF sends the information #A or the address of the L-DNS server to the EASDF.

For example, the SMF may send an Neasdf_DNSContext_Notify message to the EASDF, where the message includes the information #A or the address of the L-DNS server.

S205: The EASDF obtains the address of the target EAS based on the information #A or the address of the L-DNS server.

The following describes possible manners of the process.

Manner 1

The EASDF determines the ECS option based on the information #A.

The EASDF sends a DNS query message #A to a centralized domain name system (C-DNS) server. The DNS query message #A includes the ECS option and the identifier of the target service.

The EASDF receives a DNS response message from the C-DNS server, where the message includes the address of the target EAS.

Manner 2

The EASDF sends the DNS query message #1 to the L-DNS server. The DNS query message #1 includes the identifier of the target service.

The EASDF receives a DNS response message from the L-DNS server, where the message includes the address of the target EAS.

It should be understood that, after obtaining the address of the target EAS, the EASDF stores the address of the target EAS, or it may be described as that the EASDF stores the address of the same target EAS that needs to be accessed by the plurality of UEs to access the target service. In other words, the EASDF stores a correspondence among identifiers of the plurality of UEs, the identifier of the target service, and the address of the target EAS.

S206: The EASDF sends the address of the target EAS to the UE #1.

Correspondingly, the UE #1 receives the address of the target EAS.

For example, the process includes the following steps.

Step a: The EASDF may send a message #B to the SMF, where the message #B includes the identifier of the UE #1 and the address of the target EAS. For example, the message #B may be an Neasdf_DNSContext_Notify Request message.

Step b: The SMF inserts a traffic diversion point based on the address of the target EAS, and configures a traffic diversion rule.

Step c: The SMF sends a message #C to the EASDF, where the message #C includes indication information, and the indication information indicates the EASDF to forward the DNS response message to the UE #1. For example, the message #C may be an Neasdf_DNSContext_Notify message.

Step d: The EASDF forwards, based on the message #C, the DNS response message received in S205 to the UE #1.

S207: UE #2 sends the identifier of the target service to the EASDF. Correspondingly, the EASDF receives the identifier of the target service from the UE #2.

For example, the UE #2 may send a DNS query message #2 to the EASDF, where the DNS query message #2 includes the identifier of the target service. The DNS query message #2 is used to query an application server that needs, for the target service, to be accessed by the UE #2.

S208: The EASDF obtains the address of the target EAS locally based on an identifier of the UE #2 and the identifier of the target service.

Specifically, the process further includes the following step a to step c:

Step a: After receiving the DNS query message #2, the EASDF matches the identifier of the UE #2 with the identifiers of the plurality of UEs in the information #1, and matches the identifier of the target service in the DNS query message #2 with the identifier of the target service in the information #1. Further, the EASDF determines that the plurality of UEs include the UE #2, and the identifier of the target service in the DNS query message #2 is the same as the identifier of the target service in the information #1.

A manner in which the EASDF matches the identifier of the UE #2 with the identifiers of the plurality of UEs in the information #1 is not limited in this application. For example, if the identifiers of the plurality of UEs in the information #1 include the identifier of the UE #2, it is considered that the matching is successful. A manner in which the EASDF matches the identifier of the target service in the DNS query message #2 with the identifier of the target service in the information #1 is not limited in this application. For example, if the identifier of the target service in the DNS query message #2 is the same as the identifier of the target service in the information #1, it is considered that the matching is successful.

Optionally, the information #1 includes the foregoing another constraint condition. When the foregoing another constraint condition is included, the EASDF may further match each item in the foregoing another constraint condition with the DNS query message #2. A manner in which the EASDF matches the another constraint condition with the DNS query message #2 is not limited in this application. For example, if the foregoing constraint condition includes an access time window, the EASDF may further determine that if a time point at which the DNS query message #2 is received is within the access time window, it is considered that the matching is successful. For example, if the foregoing constraint condition includes an access location (for example, may be a location of UE, and may be represented by one or more of following: a geographic location, a cell ID, a TA ID, and a DNAI), the EASDF may further determine that if a location of the UE #2 is within the access location, it is considered that the matching is successful. For example, if the foregoing constraint condition includes an access manner (for example, access by using 3GPP), the EASDF may further determine that if the UE #2 accesses, by using 3GPP, a session in which the DNS query message #2 is sent, it is considered that the matching is successful.

Step b: Based on a case in which the foregoing matching is successful (all items in step a are successfully matched), the EASDF determines whether to perform the discovery procedure of the same application server that needs to be accessed by the plurality of UEs to access the target service, or it may be described as that the EASDF determines whether an address of the same application server that needs to be accessed by the plurality of UEs to access the target service can be determined successfully.

Because the UE #1 has initiated the DNS query, and the UE #2 is not the first UE in the plurality of UEs to initiate the DNS query to the EASDF, a result of the determining is yes. That is, the EASDF has locally stored the address of the target EAS corresponding to the plurality of UEs and the target service, or it may be described as that the EASDF can successfully determine the address of the same EAS that needs to be accessed by the plurality of UEs to access the target service.

Step c: The EASDF obtains the address of the target EAS locally.

S209: The EASDF sends the address of the target EAS to the UE #2. Correspondingly, the UE #2 receives the address of the target EAS.

For example, the process includes the following steps.

Step a: The EASDF may send a message #D to the SMF, where the message #D includes the identifier of the UE #2 and the address of the target EAS. For example, the message #D may be an Neasdf_DNSContext_Notify Request message.

Step b: The SMF inserts a traffic diversion point based on the address of the target EAS, and configures a traffic diversion rule.

Step c: The SMF sends a message #E to the EASDF, where the message #E may include indication information, and the indication information indicates the EASDF to send a DNS response message to the UE #2. For example, the message #E may be an Neasdf_DNSContext_Notify message.

Step d: The EASDF constructs the DNS response message based on the message #E, where the DNS response message includes the address of the target EAS.

Step e: The EASDF sends the constructed DNS response message to the UE #2.

According to the method in this application, the EASDF obtains, for the same target service, the identifiers (or referred to as the UE list) of the plurality of UEs that need to access the same EAS. After UE (for example, the UE #1) in the UE list performs an EAS discovery procedure for the target service, the EASDF obtains the address of the target EAS, and sends, to another UE in the list, an address of the target EAS that is the same as the address of the UE #1, so as to achieve technical effect that the plurality of UEs in the UE list select the same EAS. Optionally, in a case, the method further includes S210 to S213.

S210: The AF determines, for the target service, that another UE other than the plurality of UEs needs to access a same EAS as the plurality of UEs.

S211: The AF sends an identifier of the another UE. Correspondingly, the SMF receives the identifier of the another UE from the AF.

In a manner, if the identifiers of the plurality of UEs form a UE list (denoted as a UE list #A), the AF updates the UE list #A (where an updated list may be denoted as a UE list #B). That is, the UE list #B includes the identifiers of the plurality of UEs and the identifier of the another UE. The AF may send the UE list #B.

For example, in a manner, the AF may send the UE list #B to the PCF through an AF request message, and then the PCF initiates a PDU session modification procedure, and sends the UE list #B to the SMF through an Npcf_SMPolicyControl_Update message.

For example, in another manner, the AF sends the UE list #B to the EASDF, and the EASDF sends the UE list #B to the SMF.

S212: The SMF determines that a target EAS is unsuitable to serve as the same EAS to be accessed by the another UE and the plurality of UEs to access the target service.

The target EAS is the same EAS that needs to be accessed by the plurality of UEs to access the target service.

It should be understood that the SMF may determine whether the target EAS is suitable to serve as the same EAS to be accessed by the another UE and the plurality of UEs to access the target service.

For example, when the another UE is UE #3, if the SMF determines that the UE #3 is located in a DNAI location of the target EAS, the target EAS is suitable to serve as the same EAS to be accessed by the UE #3 and the plurality of UEs to access the target service. Otherwise, the target EAS is unsuitable to serve as the same EAS to be accessed by the UE #3 and the plurality of UEs to access the target service.

For example, if the SMF determines that the target EAS is overloaded because the UE #3 also accesses the target EAS to access the target service, the target EAS is unsuitable to serve as the same EAS to be accessed by the UE #3 and the plurality of UEs to access the target service. Otherwise, the target EAS is suitable to serve as the same EAS to be accessed by the UE #3 and the plurality of UEs to access the target service.

It should be understood that, that the target EAS is “unsuitable” to serve as the same EAS to be accessed by the UE #3 and the plurality of UEs to access the target service may also be described as that the target EAS “cannot” serve as the same EAS to be accessed by the UE #3 and the plurality of UEs to access the target service, or may be described as that the target EAS is “not an optimal” same EAS to be accessed by the UE #3 and the plurality of UEs to access the target service. That is, there is an EAS more suitable to serve as the same EAS to be accessed by the UE #3 and the plurality of UEs to access the target service.

S213: The SMF sends EAS rediscovery indication information to UE.

It should be understood that the EAS rediscovery indication information indicates the UE to re-initiate an EAS discovery procedure for the target service, or indicates the UE to initiate an EAS rediscovery procedure for the target service.

Optionally, in another case, the method further includes S214 to S216.

S214: After performing a discovery procedure of the target EAS, the SMF determines that a location of at least one UE in the plurality of UEs changes.

The target EAS is, before the location of the at least one UE changes, the same EAS that needs to be accessed by the plurality of UEs to access a target service.

S215: The SMF determines that the target EAS is unsuitable to serve, after the location of the at least one UE changes, as the same EAS to be accessed by the plurality of UEs to access the target service.

It should be understood that the SMF determines whether the target EAS is suitable to serve, after the location of the at least one UE changes, as the same EAS to be accessed by the plurality of UEs to access the target service.

For example, when the at least one UE is UE #4 in the plurality of UEs, and the SMF senses that a location of the UE #4 changes, if the SMF determines, after the location of the UE #4 changes, that the UE #4 is still located in the DNAI location of the target EAS, the target EAS remains suitable to serve, after the location of the UE #4 changes, as the same EAS to be accessed by the plurality of UEs to access the target service. Otherwise, the target EAS is unsuitable to serve, after the location of the UE #4 changes, as the same EAS to be accessed by the plurality of UEs to access the target service.

S216: The SMF sends EAS rediscovery indication information to UE.

It should be understood that the EAS rediscovery indication information indicates the UE to re-initiate an EAS discovery procedure for the target service, or indicates the UE to initiate an EAS rediscovery procedure for the target service.

Optionally, in another case, the method further includes S217 to S220.

S217: The AF determines, for the target service, that at least one UE in the plurality of UEs does not need to access a same EAS as another UE other than the at least one UE in the plurality of UEs.

S218: The AF sends an identifier of the at least one UE. Correspondingly, the SMF receives the identifier of the at least one UE from the AF.

In a manner, if the identifiers of the plurality of UEs form a UE list (denoted as a UE list #A), the AF updates the UE list #A (where an updated list may be denoted as a UE list #B). That is, the UE list #B includes identifiers of remaining UEs other than the at least one UE in the plurality of UEs. The AF may send the UE list #B.

S219: The SMF determines that the target EAS is unsuitable to serve as the same EAS to be accessed by the remaining UEs other than the at least one UE in the plurality of UEs to access the target service.

S220: The SMF sends EAS rediscovery indication information to UE.

It should be understood that the EAS rediscovery indication information indicates the UE to re-initiate an EAS discovery procedure for the target service, or indicates the UE to initiate an EAS rediscovery procedure for the target service.

According to the method in this application, when the UE list is updated or at least one UE in the UE list is relocated, the EAS discovery procedure may be triggered to be re-initiated.

FIG. 3 shows a method according to this application. The method includes the following steps.

S301: An AF determines, for a target service, a plurality of UEs that need to access a same EAS.

For this process, refer to the description of S201.

S302: The AF sends identifiers of the plurality of UEs and an identifier of the target service. Correspondingly, an EASDF #1 and an EASDF #2 receive the identifiers of the plurality of UEs and the identifier of the target service from the AF.

Optionally, the AF may further send another constraint condition for accessing the same application server by the plurality of UEs when the plurality of UEs execute the target service, where the another constraint condition includes one or more of the following:

access time points, access locations, and access manners.

Same as Embodiment 1, the foregoing information sent by the AF is denoted as information #1. For a manner in which the EASDF #1 and the EASDF #2 receive the information #1, refer to Example 1 to Example 3 in S202.

If reference is made to Example 1 in S202, the process includes:

The AF sends the information #1 to a UDM. UE #1 sends a PDU session establishment request message #1 to an SMF #1. The SMF #1 obtains the information #1 from the UDM. The SMF #1 sends the information #1 to the EASDF #1. UE #2 sends a PDU session establishment request message #2 to an SMF #2. The SMF #2 obtains the information #1 from the UDM. The SMF #2 sends the information #1 to the EASDF #2.

If reference is made to Example 2 in S202, the process includes:

The AF sends the information #1 to a PCF #1. The PCF #1 sends the information #1 to an SMF #1. The SMF #1 sends the information #1 to the EASDF #1. The AF sends the information #1 to a PCF #2. The PCF #2 sends the information #1 to an SMF #2. The SMF #2 sends the information #1 to the EASDF #2.

If reference is made to Example 3 in S202, the process includes:

The AF indicates an AS #1 to send the information #1 to the EASDF #1 through a user plane path. The AF indicates an AS #2 to send the information #1 to the EASDF #2 through a user plane path.

S303: The UE #1 sends the identifier of the target service to the EASDF #1. Correspondingly, the EASDF #1 receives the identifier of the target service from the UE #1.

For example, the UE #1 may send a DNS query message #1 to the EASDF #1, where the DNS query message #1 includes the identifier of the target service.

S304: The EASDF #1 obtains information #A or an address of an L-DNS server from an SMF.

For example, the process includes the following steps.

Step a: Refer to step a in S204. That is, the EASDF #1 executes an action of the EASDF in step a of S204.

Step b: Based on a case in which the foregoing matching is successful (all items in step a are successfully matched), the EASDF #1 queries a first network element about an address of a target EAS corresponding to the plurality of UEs and the target service through the SMF #1.

Step c: The first network element determines whether to perform a discovery procedure of the target EAS corresponding to the plurality of UEs and the target service, or it may be described as that the first network element determines whether an address of the same EAS that needs to be accessed by the plurality of UEs to access the target service can be determined successfully.

If the UE #1 is the first UE in the plurality of UEs to initiate the discovery procedure of the target EAS, a result of the determining is no. That is, the first network element has yet to locally store the address of the target EAS corresponding to the plurality of UEs and the target service, or it may be described as that the first network element cannot successfully determine the address of the same EAS that needs to be accessed by the plurality of UEs to access the target service.

Step d: When the result of the determining in step c is no, the first network element sends feedback information to the EASDF #1 through the SMF #1.

The feedback information is used to trigger the EASDF #1 to obtain the address of the target EAS. For example, the feedback information is acknowledgment (acknowledgment, ACK) information.

For example, the first network element may store a flag, and the flag indicates whether the discovery procedure of the target EAS is performed. For example, if a value of the flag is 0, it indicates that the discovery procedure of the target EAS is not performed, or the first network element does not store or cannot successfully determine the address of the same EAS that needs to be accessed by the plurality of UEs to access the target service. If the value of the flag is 1, it indicates that the discovery procedure of the target EAS is performed. If the first network element sends the feedback information to the EASDF #1 through the SMF #1, the first network element sets the value of the flag to "1".

Step e: the EASDF #1 sends a message #A to the SMF #1, where the message #A includes an identifier of the UE #1 and the identifier of the target service.

For example, the message #A is an Neasdf_DNSContext_Notify Request message.

Optionally, in another manner, in step d, the first network element sends the feedback information to the SMF #1, and the SMF #1 does not send the feedback information to the EASDF #1. Step e is not performed. After receiving the feedback information, the SMF #1 triggers the SMF #1 to perform the following step f. A manner in which the first network element sends the feedback information to the SMF is not limited in this application. In a possible example, when the first network element is a UDM, the feedback information may be sent through a Nudm_UECM_Update message; when the first network element is an NEF, the feedback information may be sent through an Nnef_SMContext_Delivery message; when the first network element is an NRF, the feedback information may be sent through an Nnrf_NFManagement_NFUpdate message; when the first network element is a PCF, the feedback information may be sent through an Npcf_SMPolicyControl_Update message; or when the first network element is an NWDAF, the feedback information may be sent through an Nnwdaf_AnalyticsInfo_Transfer message.

Step f: The SMF #1 determines the information #A or the address of the L-DNS server. For this process, refer to step d in S204.

Step g: The SMF #1 sends the information #A or the address of the L-DNS server to the EASDF #1.

S305: The EASDF #1 obtains the address of the target EAS based on the information #A or the address of the L-DNS server.

For this process, refer to S205.

S306: The EASDF #1 sends the address of the target EAS to the UE #1 and the first network element.

For example, the process includes the following steps.

Step a: The EASDF #1 may send a message #B to the SMF #1, where the message #B includes the identifier of the UE #1 and the address of the target EAS. For example, the message #B may be an Neasdf_DNSContext_Notify Request message.

Step b: The SMF #1 sends the identifiers of the plurality of UEs, the identifier of the target service, and the address of the target EAS to the first network element. Correspondingly, the first network element stores a correspondence among the identifiers of the plurality of UEs, the identifier of the target service, and the address of the target EAS, or it may be described as that the SMF #1 sends, to the first network element, the address of the target EAS to be accessed by the plurality of UEs to access the target service. Correspondingly, the first network element stores the address of the target EAS to be accessed by the plurality of UEs to access the target service.

Step c: The SMF #1 inserts a traffic diversion point based on the address of the target EAS, and configures a traffic diversion rule.

Step d: The SMF #1 sends a message #C to the EASDF #1, where the message #C includes indication information, and the indication information indicates the EASDF #1 to send a DNS response message to the UE #1. For example, the message #C may be an Neasdf_DNSContext_Notify message.

Step e: The EASDF sends the DNS response message to the UE #1 based on the message #C, where the DNS response message includes the address of the target EAS.

S307: The UE #2 sends the identifier of the target service to the EASDF #2. Correspondingly, the EASDF #2 receives the identifier of the target service from the UE #2.

For example, the UE #2 may send a DNS query message #2 to the EASDF #2, where the DNS query message #2 includes the identifier of the target service.

S308: The EASDF #2 receives the address of the target EAS from the first network element.

For example, the process includes the following steps.

Step a: After receiving the DNS query message #2, the EASDF #2 matches the identifier of the UE #2 with the identifiers of the plurality of UEs in the information #1, and matches the identifier of the target service in the DNS query message #2 with the identifier of the target service in the information #1. Further, the EASDF #2 determines that the plurality of UEs include the UE #2, and the identifier of the target service in the DNS query message #2 is the same as the identifier of the target service in the information #1.

Optionally, the information #1 includes the foregoing another constraint condition. When the foregoing another constraint condition is included, the EASDF #2 may further match each item in the foregoing another constraint condition with the DNS query message #2. For details, refer to the foregoing description. Details are not described again.

Step b: Based on a case in which the foregoing matching is successful (all items in step a are successfully matched), the EASDF #2 queries the first network element about the address of the target EAS corresponding to the plurality of UEs and the target service through the SMF #2.

Step c: The first network element determines whether to perform the discovery procedure of the target EAS corresponding to the plurality of UEs and the target service, or it may be described as that the first network element determines whether the address of the same EAS that needs to be accessed by the plurality of UEs to access the target service can be determined successfully.

Because the UE #1 has initiated the discovery procedure of the target EAS, that is, the UE #2 is not the first UE in the plurality of UEs to initiate the discovery procedure of the target EAS, a result of the determining is yes. That is, the first network element has locally stored the address of the target EAS corresponding to the plurality of UEs and the target service, or it may be described as that the first network element may successfully determine the address of the same EAS that needs to be accessed by the plurality of UEs to access the target service. For example, the first network element may determine, based on the stored correspondence among the identifiers of the plurality of UEs, the identifier of the target service, and the address of the target EAS, the address of the same EAS that needs to be accessed by the plurality of UEs to access the target service.

For example, the first network element may determine the value of the flag in the foregoing description. Because the value of the flag is 1, the discovery procedure of the target EAS is performed.

Step d: The first network element sends the address of the target EAS to the EASDF #2 through the SMF #2.

It should be understood that if the discovery procedure of the target EAS is performed, for example, the value of flag in the foregoing description is 1, but the first network element has not obtained the address of the target EAS from the EASDF #1, subsequent steps are not performed until the first network element obtains the address of the target EAS from the EASDF #1.

S309: The EASDF #2 sends the address of the target EAS to the UE #2. Correspondingly, the UE #2 receives the address of the target EAS.

For this process, refer to S209. That is, the EASDF #2 executes an action of the EASDF in S209, and the SMF #2 executes an action of the SMF in S209.

For example, the EASDF #1 and the EASDF #2 in Embodiment 3 may be a same EASDF, and the SMF #1 and the SMF #2 may be a same SMF.

According to the method in this application, at least one EASDF (for example, the EASDF #1 and the EASDF #2) obtains, for the same target service, the identifiers (or referred to as a UE list) of the plurality of UEs that need to access the same EAS. After UE (for example, the UE #1) in the UE list performs the EAS discovery procedure for the target service, the first network element obtains the address of the target EAS. When another UE in the UE list performs the EAS discovery procedure for the target service, the first network element sends the address of the target EAS that is the same as the address of the UE #1 to the corresponding EASDF, so as to achieve technical effect that the plurality of UEs in the UE list select the same EAS.

The following describes a second solution provided in this application.

A first network element obtains first information, where the first information indicates that for a target service, a first terminal and a second terminal need to access a same EAS; the first network element obtains an address of a target EAS, where the target EAS is an EAS to be accessed by the first terminal to access the target service; and the first network element sends the address of the target EAS to the second terminal based on the first information. The first network element may be an SMF or an EASDF.

Figure 4:
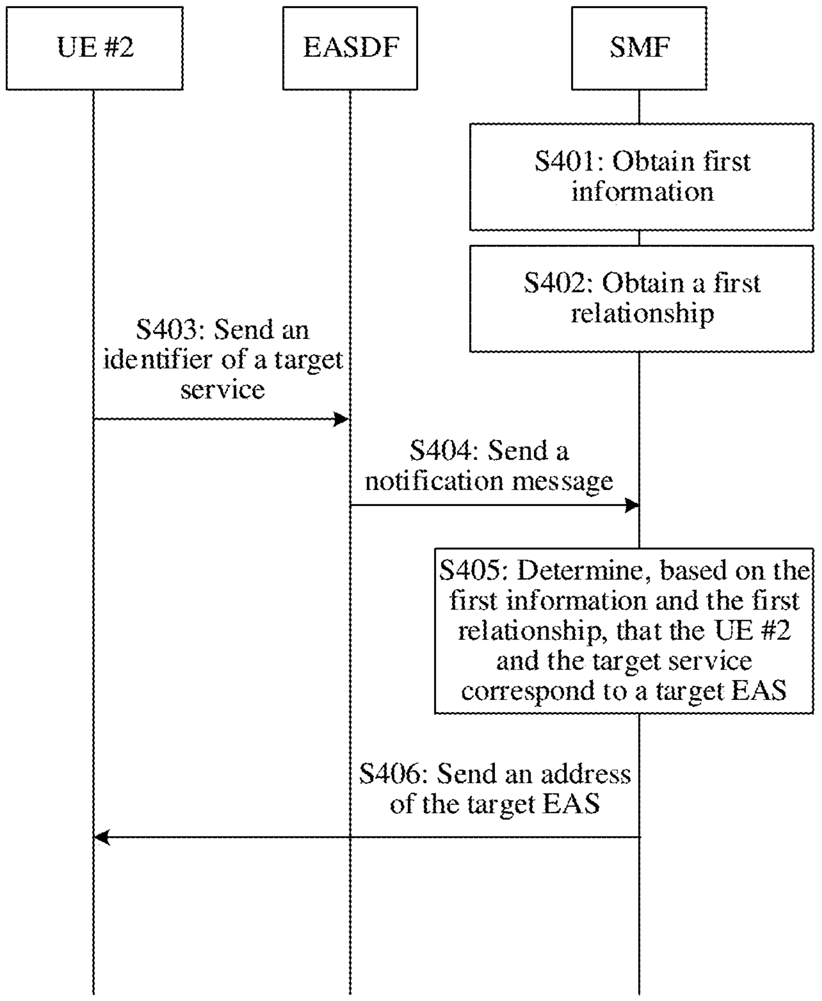
FIG. 4 is a schematic interaction diagram of a method according to this application.
Figure 5:
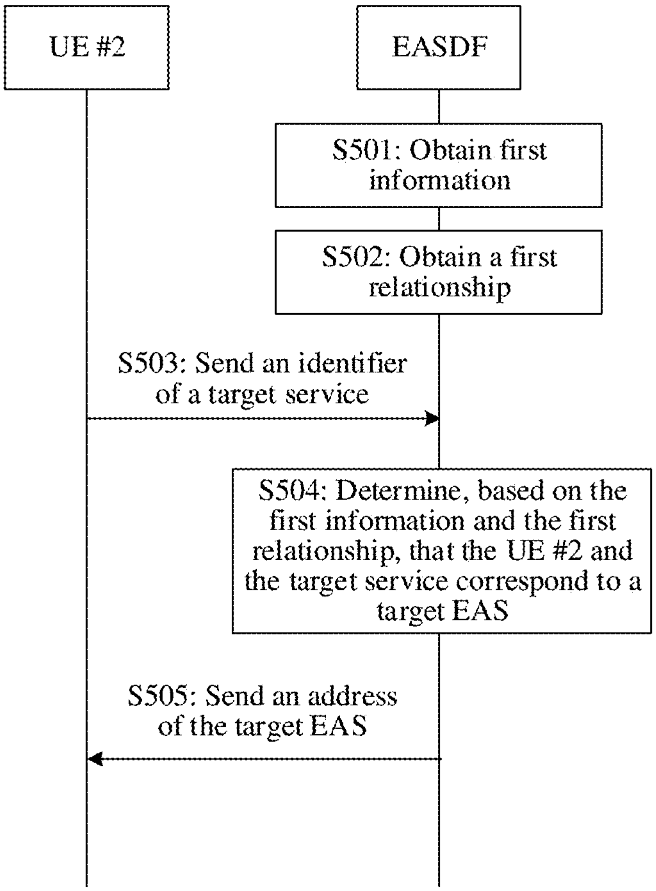
FIG. 5 is a schematic interaction diagram of a method according to this application.

The following describes the second solution in detail with reference to FIG. 4 and FIG. 5.

To better describe solutions in FIG. 4 and FIG. 5, an existing EAS discovery procedure is first described herein. The procedure includes step 1 to step 19.

Step 1: UE initiates a PDU session establishment procedure.

Step 2: The SMF selects the EASDF.

Step 3: The SMF sends a DNS processing rule to the EASDF. Correspondingly, the EASDF receives the DNS processing rule.

The EASDF may process a DNS message according to the DNS processing rule.

For example, the SMF may send an Neasdf_DNSContext_Create Request message to the EASDF.

Step 4: The EASDF sends an Neasdf_DNSContext_Create Response message to the SMF.

Step 5: The SMF may send an updated DNS processing rule to the EASDF, and correspondingly, the EASDF receives the updated DNS processing rule.

For example, the SMF may send an Neasdf_DNSContext_Update Request message to the EASDF.

Step 6: The EASDF sends an Neasdf_DNSContext_Update Response message to the SMF.

Step 7: The UE sends a DNS query message to the EASDF, where the DNS query message includes an identifier of a service to be accessed by the UE.

Step 8: The EASDF matches the identifier of the service in the DNS query message with the DNS processing rule. If the matching is successful, the EASDF reports the identifier of the service to the SMF.

For example, the EASDF may send an Neasdf_DNSContext_Notify Request message to the SMF.

Step 9: The SMF sends an Neasdf_DNSContext_Notify Response message to the EASDF.

Step 10: The SMF determines and sends information #A or an address of an L-DNS server to the EASDF based on the identifier of the service and a location of the UE.

For example, the SMF may send an Neasdf_DNSContext_Update Request message to the EASDF.

Step 11: The EASDF sends the Neasdf_DNSContext_Update Response message to the SMF.

Step 12: The EASDF sends the DNS query message to a DNS server.

Step 13: The DNS server sends a DNS response message to the EASDF, where the DNS response message includes the address of the EAS.

Step 14: The EASDF matches the address of the EAS in the DNS response message with the DNS processing rule. If the matching is successful, the EASDF caches the DNS response message and reports the address of the EAS to the SMF.

For example, the EASDF may send an Neasdf_DNSContext_Notify Request message to the SMF.

Step 15: The SMF sends the Neasdf_DNSContext_Notify Response message to the EASDF.

Step 16: The SMF inserts a traffic diversion point based on the address of the EAS, configures a traffic diversion rule, and may insert a local PSA.

Step 17: The SMF sends a message to the EASDF, indicating the EASDF to send the DNS response message to the UE.

For example, the SMF may send an Neasdf_DNSContext_Update Request message to the EASDF.

Step 18: The EASDF sends the Neasdf_DNSContext_Update Response message to the SMF.

Step 19: The EASDF sends the DNS response message to the UE, where the DNS response message includes the address of the EAS.

FIG. 4 shows a method according to this application. The method includes the following steps.

S401: An SMF obtains first information.

The first information indicates that for a target service, UE #1 and UE #2 need to access a same EAS.

The following uses several examples to describe a manner in which the SMF obtains the first information.

Example 1

The UE #2 obtains the first information. The UE #2 sends the first information to the SMF.

A manner in which the UE #2 obtains the first information includes but is not limited to the following two manners:

Manner 1

The UE #1 sends an identifier #A and an identifier of the target service to the UE #2. For example, the identifier #A may be an identifier of the UE #1. For example, the identifier #A may alternatively be another identifier that associates the UE #1 with the UE #2, for example, may be a room number of a same game room in which the UE #1 and the UE #2 enter a specific game. For the identifier #A, details are not described below again.

The UE #2 determines, for the target service based on the identifier #A and the identifier of the target service, that the UE #2 and the UE #1 need to access the same EAS.

For example, after accessing a specific game service, the UE #1 sends, in a game room, an invitation link to the UE #2 (for example, through specific chat software). After a user of the UE #2 taps or clicks the invitation link, the UE #2 learns that for the game service, the UE #2 needs to access the same EAS as the UE #1.

Manner 2

A user configures the first information for the UE #2. For example, after the UE #2 accesses a specific game service, the user of the UE #2 manually enters an identifier #A in a login server of the game service, for example, a room number for the game service that the UE #1 is accessing.

Example 2

The UE #2 obtains the first information. The UE #2 sends the first information to the EASDF. The EASDF sends the first information to the SMF. For example, the EASDF may send the first information to the SMF through an Neasdf_DNSContext_Notify Request message.

For a manner in which the UE #2 obtains the first information, refer to Example 1 in S401.

S402: The SMF obtains a first relationship, where the first relationship is a correspondence among an identifier of the UE #1, the identifier of the target service, and an address of a target EAS.

The SMF may obtain the first relationship in an EAS discovery procedure initiated by the UE #1 for the target service. The target EAS is an application server that the UE #1 needs to access when accessing the target service. It should be noted that the EAS discovery procedure for the target service may be an example of an existing EAS discovery procedure described before Embodiment 3, or may be any other procedure that can achieve technical effect of EAS discovery. This is not limited in this application.

In a manner, in an EAS discovery procedure for some specific services initiated by the UE #1 (such as a multi-player interactive game, a multi-person online conference, and Internet-based multi-vehicle platooning), the SMF needs to store the first relationship. The specific services include the target service.

In another manner, in an EAS discovery procedure initiated by the UE #1 for any service, the SMF stores the first relationship. Optionally, the SMF deletes the first relationship after storing the first relationship for a period of time.

In another manner, in the EAS discovery procedure initiated by the UE #1 for the target service, the UE #1 or the EASDF may send indication information to the SMF, where the indication information indicates the SMF to store the first relationship. For example, the UE #1 may send the indication information to the SMF through a session establishment request message. For example, the EASDF may alternatively send the indication information to the SMF through an Neasdf_DNSContext_Notify Request message.

For example, if the EAS discovery procedure is performed according to the foregoing method, the SMF may store the first relationship in a process of performing the foregoing step 16, or perform EAS discovery by using any method other than the foregoing method, and may store the first relationship at any reasonable moment in the procedure. A moment at which the SMF stores the first relationship is not limited in this application.

It should be noted that a moment or a time sequence of performing steps S401 and S402 is not limited, and steps S401 and S402 do not trigger or impact each other.

S403: The UE #2 sends the identifier of the target service to the EASDF. Correspondingly, the EASDF receives the identifier of the target service from the UE #2.

For example, the UE #2 may send a DNS query message to the EASDF, where the DNS query message includes the identifier of the target service. The DNS query message is used to query, for the target service, an address of an application server that needs to be accessed by the UE #2.

S404: The EASDF sends a notification message to the SMF. Correspondingly, the SMF receives the notification message from the EASDF.

The notification message includes an identifier of the UE #2 and the identifier of the target service.

For example, the notification message is the Neasdf_DNSContext_Notify Request message.

S405: The SMF determines, based on the first information and the first relationship, that the UE #2 and the target service correspond to the target EAS.

In other words, the SMF determines that an EAS that needs to be accessed by the UE #2 to access the target service is the target EAS. Likewise, the target EAS is the EAS that needs to be accessed by the UE #1 to access the target service.

For example, in a manner, the SMF determines, based on the identifier of the UE #2, the identifier of the target service, and the first information, that the UE #2 needs, when accessing the target service, to access the same EAS to be accessed by the UE #1 to access the target service. Further, the SMF determines, based on the first relationship, the address of the EAS to be accessed by the UE #1 to access the target service. In this way, the SMF determines the address of the EAS that needs to be accessed by the UE #2 to access the target service.

For example, in another manner, the SMF may determine a second relationship based on the first relationship and the first information. The second relationship is a correspondence among the identifier of the UE #2, the identifier of the target service, and the address of the target EAS. Optionally, the process may precede S403. The identifier of the UE #2 may be an IP address of the UE #2. It should be understood that, if the UE #2 is in a session establishment procedure, the SMF allocates an IP address to the UE #2, and if the UE #2 is in a session modification procedure, the SMF perceives the IP address of the UE #2.

After the SMF receives the notification message from the EASDF in S404, the SMF determines, based on the second relationship, that the UE #2 and the target service correspond to the target EAS.

S406: The SMF sends the address of the target EAS to the UE #2.

For example, the process includes the following steps.

Step a: The SMF inserts a traffic diversion point based on the address of the target EAS, and configures a traffic diversion rule.

Step b: The SMF sends a message #A to the EASDF, where the message #A may include the address of the target EAS and indication information, and the indication information indicates the EASDF to send a DNS response message to the UE #2. For example, the message #A may be an Neasdf_DNSContext_Notify message.

Step d: The EASDF constructs the DNS response message based on the message #A, where the DNS response message includes the address of the target EAS.

Step e: The EASDF sends the constructed DNS response message to the UE #2.

According to the method in this application, the SMF learns that for the target service, the UE #1 and the UE #2 need to access the same EAS. Further, the SMF learns of, for the target service, the address of the target EAS to be accessed by the UE #1. Further, in the EAS discovery procedure of the UE #2 for the target service, the SMF sends the address of the target EAS to the UE #2 through the EASDF, so as to achieve technical effect that the UE #2 and the UE #1 select the same EAS.

Optionally, in another manner, the SMF obtains the first information in S401, and the SMF obtains the first relationship in S402. Further, the SMF may send the identifier of the target service and the address of the target EAS to the UE #2, to indicate the UE #2 to access the target EAS when accessing the target service, or it may be described as that the SMF sends indication information to the UE #2, where the indication information indicates the UE #2 to access the target EAS when accessing the target service, and the indication information includes the identifier of the target service and the address of the target EAS, or it may be described as that the indication information includes an association relationship between the identifier of the target service and the address of the target EAS. Further, when accessing the target service, the UE #2 accesses the target EAS based on the identifier of the target service and the address of the target EAS, or the indication information. The method can also achieve the technical effect that the UE #2 and the UE #1 select the same EAS.

Optionally, for different SMFs, a centralized network element (for example, a UDM, a UDR, an NEF, an NRF, a PCF, or an NWDAF) is required to manage coordinated access.

The following uses two SMFs (an SMF #1 and an SMF #2) as an example for description.

Step 1: The SMF #2 obtains the first information. The first information indicates that for the target service, the UE #1 and the UE #2 need to access the same EAS.

Step 2: The SMF #1 obtains the first relationship, where the first relationship is the correspondence among the identifier of the UE #1, the identifier of the target service, and the address of the target EAS.

The UE #1 initiates an EAS discovery procedure earlier than the UE #2, and the SMF #1 may obtain the first relationship in the EAS discovery procedure initiated by the UE #1.

Step 3: The SMF #1 sends the first relationship to the centralized network element.

It should be understood that step 1, step 2, and step 3 may also be performed in a sequence of step 2, step 3, and step 1. This is not limited.

Step 4: the UE #2 sends a DNS query message to the EASDF, where the DNS query message includes the identifier of the target service.

Step 5: The EASDF sends a notification message to the SMF #2. The notification message includes the identifier of the UE #2 and the identifier of the target service.

Step 6: The SMF #2 sends a request message to the centralized network element, where the request message is used to request the address of the target EAS to be accessed by the UE #1 to access the target service, and the request message includes the first information.

Step 7: The centralized network element sends the address of the target EAS to the SMF #2 based on the first information and the first relationship.

For example, the centralized network element may determine, based on the first information and the first relationship, that the UE #2 and the target service correspond to the target EAS.

For example, the centralized network element may determine a second relationship based on the first information and the first relationship, where the second relationship is a correspondence among the identifier of the UE #2, the identifier of the target service, and the address of the target EAS, and further determine that the UE #2 and the target service correspond to the target EAS.

Step 8: The SMF #2 sends the address of the target EAS to the UE #2.

For example, the SMF #2 sends the address of the target EAS to the UE #2 through the EASDF. Refer to step S406.

FIG. 5 shows a method according to this application. The method includes the following steps.

S501: An EASDF obtains first information.

The first information indicates that for a target service, UE #1 and UE #2 need to access a same EAS.

The following uses several examples to describe a manner in which the EASDF obtains the first information.

Example 1

The UE #2 obtains the first information. The UE #2 sends the first information to the EASDF.

For a manner in which the UE #2 obtains the first information, refer to Example 1 in S401.

Example 2

The UE #2 obtains the first information. The UE #2 sends the first information to an SMF. The SMF sends the first information to the EASDF. For example, the SMF may send the first information to the EASDF through an Neasdf_DNSContext_Notify message.

For a manner in which the UE #2 obtains the first information, refer to Example 1 in S401.

S502: The EASDF obtains a first relationship, where the first relationship is a correspondence among an identifier of the UE #1, an identifier of the target service, and an address of a target EAS.

The EASDF may obtain the first relationship in an EAS discovery procedure initiated by the UE #1 for the target service. The target EAS is an application server that the UE #1 needs to access when accessing the target service.

In a manner, in an EAS discovery procedure for some specific services initiated by the UE #1 (such as a multi-player interactive game, a multi-person online conference, and Internet-based multi-vehicle platooning), the EASDF needs to store the first relationship. The specific services include the target service.

In another manner, in an EAS discovery procedure initiated by the UE #1 for any service, the EASDF stores the first relationship. Optionally, the EASDF deletes the first relationship after storing the first relationship for a period of time.

In another manner, in the EAS discovery procedure initiated by the UE #1 for the target service, the UE #1 or the SMF may send indication information to the EASDF, where the indication information indicates the EASDF to store the first relationship. For example, the SMF may send the indication information to the EASDF through an Neasdf_DNSContext_Notify message.

For example, if the EAS discovery procedure is performed according to the foregoing method, the EASDF may store the first relationship in a process of performing the foregoing step 14 and step 15, or perform EAS discovery by using any method other than the foregoing method, and may store the first relationship at any reasonable moment in the procedure. A moment at which the EASDF stores the first relationship is not limited in this application.

It should be noted that a moment or a time sequence of performing steps S501 and S502 is not limited, and steps S501 and S502 do not trigger or impact each other.

S503: The UE #2 sends the identifier of the target service to the EASDF. Correspondingly, the EASDF receives the identifier of the target service from the UE #2.

For example, the UE #2 may send a DNS query message to the EASDF, where the DNS query message includes the identifier of the target service. The DNS query message is used to query, for the target service, an address of an application server that needs to be accessed by the UE #2.

S504: The EASDF determines, based on the first information and the first relationship, that the UE #2 and the target service correspond to the target EAS.

In other words, the EASDF determines that an EAS that needs to be accessed by the UE #2 to access the target service is the target EAS. Likewise, the target EAS is the EAS that needs to be accessed by the UE #1 to access the target service.

For example, in a manner, the EASDF determines, based on the identifier of the UE #2, the identifier of the target service, and the first information, that the UE #2 needs, when accessing the target service, to access the same EAS to be accessed by the UE #1 to access the target service. Further, the EASDF determines, based on the first relationship, the address of the EAS to be accessed by the UE #1 to access the target service. In this way, the EASDF determines the address of the EAS that needs to be accessed by the UE #2 to access the target service.

For example, in another manner, the EASDF may determine a second relationship based on the first relationship and the first information. The second relationship is a correspondence among the identifier of the UE #2, the identifier of the target service, and the address of the target EAS. Optionally, the process may precede S503.

After receiving the DNS query message from the UE #2 in S503, the EASDF determines, based on the second relationship, that the UE #2 and the target service correspond to the target EAS.

It should be noted that the message sent by the UE #2 to the EASDF in S503 may exclude the identifier of the UE #2. In this case, the EASDF may determine the identifier of the UE #2 based on a source address of the message in S503, for example, use a source IP address of the message in S503 as the identifier of the UE #2.

S505: The EASDF sends the address of the target EAS to the UE #2.

For example, the process includes the following steps.

Step a: The EASDF sends a notification message to the SMF, where the notification message includes the identifier of the UE #2 and the address of the target EAS.

Step b: Refer to step a in S406.

Step c: Refer to step b in S406.

Step d: Refer to step c in S406.

Step e: Refer to step d in S406.

According to the method in this application, the EASDF learns that for the target service, the UE #1 and the UE #2 need, to access the same EAS. Further, the EASDF learns of, for the target service, the address of the target EAS to be accessed by the UE #1. Further, in the EAS discovery procedure of the UE #2 for the target service, the EASDF sends the address of the target EAS to the UE #2, so as to achieve the technical effect that the UE #2 and the UE #1 select the same EAS.

Optionally, in another manner, the EASDF obtains the first information in S501, and the EASDF obtains the first relationship in S502. Further, the EASDF may send indication information to the UE #2, where the indication information indicates the UE #2 to access the target EAS when accessing the target service, and the indication information includes an association relationship between the identifier of the target service and the address of the target EAS. Further, when accessing the target service, the UE #2 accesses the target EAS based on the indication information. The method can also achieve the technical effect that the UE #2 and the UE #1 select the same EAS.

Optionally, for different EASDFs, a centralized network element (for example, a UDM, a UDR, an NEF, an NRF, a PCF, or an NWDAF) is required to manage coordinated access.

The following uses two EASDFs (an EASDF #1 and an EASDF #2) as an example for description.

Step 1: The EASDF #2 obtains the first information. The first information indicates that for the target service, the UE #1 and the UE #2 need to access the same EAS.

Step 2: The EASDF #1 obtains the first relationship, where the first relationship is a correspondence among the identifier of the UE #1, the identifier of the target service, and the address of the target EAS.

The UE #1 initiates an EAS discovery procedure earlier than the UE #2, and the EASDF #1 may obtain the first relationship in the EAS discovery procedure initiated by the UE #1.

Step 3: The EASDF #1 sends the first relationship to the centralized network element.

It should be understood that step 1, step 2, and step 3 may also be performed in a sequence of step 2, step 3, and step 1. This is not limited.

Step 4: the UE #2 sends a DNS query message to the EASDF #2, where the DNS query message includes the identifier of the target service.

Step 5: The EASDF #2 sends a request message to the centralized network element, where the request message is used to request the address of the target EAS to be accessed by the UE #1 to access the target service, and the request message includes the first information.

Step 6: The centralized network element sends the address of the target EAS to the EASDF #2 based on the first relationship and the first information.

For example, the centralized network element may determine, based on the first information and the first relationship, that the UE #2 and the target service correspond to the target EAS.

For example, the centralized network element may determine a second relationship based on the first information and the first relationship, where the second relationship is a correspondence among the identifier of the UE #2, the identifier of the target service, and the address of the target EAS, and further determine that the UE #2 and the target service correspond to the target EAS.

Step 7: The EASDF #2 sends the address of the target EAS to the UE #2.

For example, refer to step S505.

Figure 6:
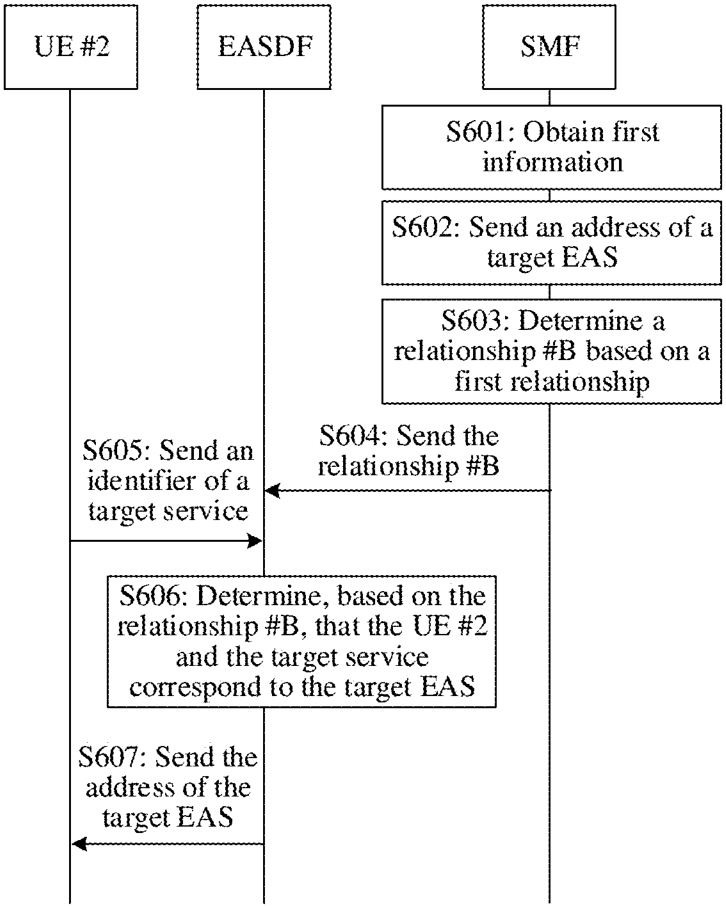
FIG. 6 is a schematic interaction diagram of a method according to this application.

The following describes in detail a third solution provided in this application with reference to FIG. 6.

S601: An SMF obtains first information.

The first information indicates that for a target service, UE #1 and UE #2 need to access a same EAS.

For a manner in which the SMF obtains the first information, refer to S401.

S602: The SMF obtains an address of a target EAS, where the target EAS is an EAS to be accessed by the UE #1 to access the target service.

It should be understood that the SMF may obtain a relationship #A, where the relationship #A includes the address of the target EAS. The relationship #A is a correspondence among an identifier of the UE #1, an identifier of the target service, and the address of the target EAS.

For a manner in which the SMF obtains the relationship #A, refer to the description in S402.

S603: The SMF determines a relationship #B based on the first information. The relationship #B is a correspondence among an identifier of the UE #2, the identifier of the target service, and the address of the target EAS.

It should be understood that, after obtaining the address of the target EAS, the SMF may determine the relationship #B based on the first information.

In another description, the SMF may determine the relationship #B based on the first information and the relationship #A. That is, the SMF determines that the UE #2 and the target service correspond to the target EAS. Likewise, the target EAS is an EAS to be accessed by the UE #1 to access the target service.

S604: The SMF sends the relationship #B to the EASDF. Correspondingly, the EASDF receives the relationship #B.

S605: The UE #2 sends the identifier of the target service to the EASDF. Correspondingly, the EASDF receives the identifier of the target service from the UE #2.

For example, the UE #2 may send a DNS query message to the EASDF, where the DNS query message includes the identifier of the target service. The DNS query message is used to query, for the target service, an address of an application server that needs to be accessed by the UE #2.

S606: The EASDF determines, based on the relationship #B, that the UE #2 and the target service correspond to the target EAS.

In other words, the EASDF determines that an EAS that needs to be accessed by the UE #2 to access the target service is the target EAS. Likewise, the target EAS is the EAS that needs to be accessed by the UE #1 to access the target service.

S607: The EASDF sends the address of the target EAS to the UE #2.

For example, the process includes the following steps.

Step a: The EASDF sends a notification message to the SMF, where the notification message includes the identifier of the UE #2 and the address of the target EAS.

Step b: Refer to step a in S406.

Step c: Refer to step b in S406.

Step d: Refer to step c in S406.

Step e: Refer to step d in S406.

According to the method in this application, the SMF learns that for the target service, the UE #1 and the UE #2 need to access the same EAS. Further, the SMF learns of, for the target service, the address of the target EAS to be accessed by the UE #1. The SMF sends the correspondence among the identifier of the UE #2, the identifier of the target service, and the address of the target EAS to the EASDF. Further, in an EAS discovery procedure of the UE #2 for the target service, the EASDF sends the address of the target EAS to the UE #2, so as to achieve the technical effect that the UE #2 and the UE #1 select the same EAS.

Optionally, for different EASDFs, a centralized network element (for example, a UDM, a UDR, an NEF, an NRF, a PCF, or an NWDAF) is required to manage coordinated access.

Figure 7:
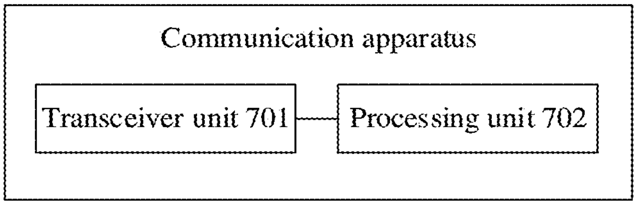
FIG. 7 is a schematic block diagram of a communication apparatus according to this application.

According to the foregoing method, FIG. 7 shows a communication apparatus according to an embodiment of this application. The communication apparatus includes a transceiver unit 701 and a processing unit 702.

The transceiver unit 701 may be configured to implement a corresponding information receiving and sending function. The transceiver unit 701 may also be referred to as a communication interface or a communication unit. The processing unit 702 may be configured to perform a processing operation.

For example, the apparatus further includes a storage unit. The storage unit may be configured to store instructions and/or data. The processing unit 702 may read the instructions and/or the data in the storage unit, so that the apparatus implements actions of the apparatus in the foregoing method embodiments.

In a first implementation, the apparatus may be the EASDF network element in the foregoing embodiments, or may be a component (for example, a chip) of the EASDF network element, where the transceiver unit and the processing unit may be configured to implement related operations of the EASDF network element in the foregoing method embodiments.

In a second implementation, the apparatus may be the SMF network element in the foregoing embodiments, or may be a component (for example, a chip) of the SMF network element, where the transceiver unit and the processing unit may be configured to implement related operations of the SMF network element in the foregoing method embodiments.

In a third implementation, the apparatus may be the AF network element in the foregoing embodiments, or may be a component (for example, a chip) of the AF network element, where the transceiver unit and the processing unit may be configured to implement related operations of the AF network element in the foregoing method embodiments.

In a fourth implementation, the apparatus may be the first network element in FIG. 3, or may be a component (for example, a chip) of the first network element, where the transceiver unit and the processing unit may be configured to implement related operations of the UE in the foregoing method embodiments.

In a fifth implementation, the apparatus may be the UE in the foregoing embodiments, or may be a component (for example, a chip) of the UE, where the transceiver unit and the processing unit may be configured to implement related operations of the UE in the foregoing method embodiments.

It should be understood that a specific process in which the units perform the foregoing corresponding steps is described in detail in the foregoing method embodiments. For brevity, details are not described herein.

It should also be understood that the apparatus herein is presented in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus may be specifically the first network element in the foregoing embodiments, and may be configured to perform the procedures and/or steps corresponding to the first network element in the foregoing method embodiments. Alternatively, the apparatus may be specifically the network management network element in the foregoing embodiments, and may be configured to perform the procedures and/or steps corresponding to the network management network element in the foregoing method embodiments. To avoid repetition, details are not described herein again.

The foregoing communication apparatus has a function of implementing corresponding steps performed by the apparatus in the foregoing method. The function may be implemented by hardware, or may be implemented by executing corresponding software by hardware. The hardware or software includes one or more modules corresponding to the foregoing function. For example, a transceiver unit may be replaced with a transceiver (for example, a sending unit in the transceiver unit may be replaced with a transmitter, and a receiving unit in the transceiver unit may be replaced with a receiver), and another unit such as a processing unit may be replaced with a processor, to separately perform sending and receiving operations and a related processing operation in the method embodiments.

In addition, the transceiver unit 701 may alternatively be a transceiver circuit (for example, the transceiver circuit may include a receiver circuit and a transmitter circuit), and the processing unit may be a processing circuit.

It should be noted that the apparatus in FIG. 7 may be the apparatus in the foregoing method embodiments, or may be a chip or a chip system, for example, a system-on-a-chip (system-on-a-chip, SoC). The transceiver unit may be an input/output circuit or a communication interface. The processing unit is a processor, a microprocessor, or an integrated circuit integrated on the chip. This is not limited herein.

Figure 8:
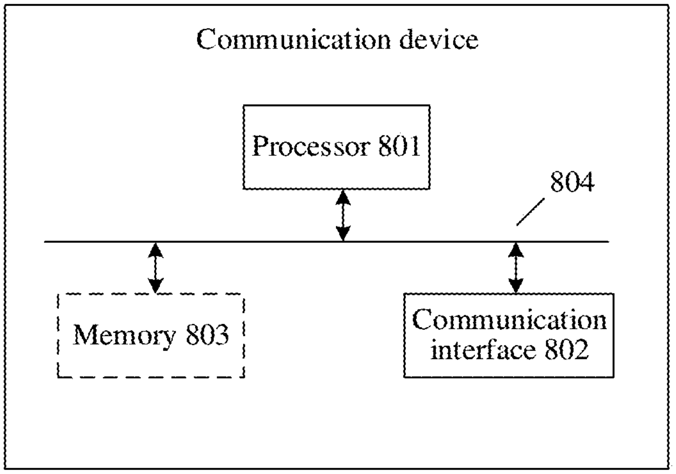
FIG. 8 is a schematic block diagram of a communication device according to this application.

Embodiments of this application further provides a communication device. As shown in FIG. 8, the communication device includes a processor 801 and a communication interface 802. The processor 801 is configured to execute a computer program or instructions stored in a memory 803, or read data stored in the memory 803, to perform the methods in the foregoing method embodiments. For example, there are one or more processors 801. The communication interface 802 is configured to receive and/or send a signal. For example, the processor 801 is configured to control the communication interface 802 to receive and/or send a signal.

Optionally, as shown in FIG. 8, the communication device further includes the memory 803, and the memory 803 is configured to store a computer program or instructions and/or data. The memory 803 may be integrated with the processor 801, or may be disposed separately. For example, there are one or more memories 803.

Optionally, the processor 801, the communication interface 802, and the memory 803 are connected to each other by using a bus 804. The bus 804 may be a peripheral component interconnect (peripheral component interconnect, PCI) bus, an extended industry standard architecture (EISA) bus, or the like. The bus 804 may be classified into an address bus, a data bus, a control bus, and the like. For ease of representation, only one thick line is used to represent the bus in FIG. 8, but this does not mean that there is only one bus or only one type of bus.

For example, the processor 801 is configured to execute the computer program or the instructions stored in the memory 803, to implement related operations of the EASDF network element, the SMF network element, the AF network element, and the first network element in FIG. 3 in the foregoing method embodiments.

It should be understood that a processor (such as the processor 801) mentioned in embodiments of this application may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

It may be further understood that a memory (such as a memory 1603) mentioned in embodiments of this application may be a volatile memory or a non-volatile memory, or may include a volatile memory and a non-volatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by an application server discovery network element, an identifier of a target service from a first terminal;
obtaining, by the application server discovery network element, based on an identifier of the first terminal and the identifier of the target service, first information or an address of a local domain name system server corresponding to the identifier of the target service from a session management network element, wherein the first information is used to determine an extension mechanism for a domain name system client subnet option, or the first information is an extension mechanism for a domain name system client subnet option;
obtaining, by the application server discovery network element, an address of a target application server that needs to be accessed by a plurality of terminals to access the target service based on the first information or the address of the local domain name system server, wherein the plurality of terminals comprise the first terminal; and
sending, by the application server discovery network element, the address of the target application server to the first terminal.

2. The method according to claim 1, further comprising:
storing, by the application server discovery network element, the address of the target application server that needs to be accessed by the plurality of terminals to access the target service.

3. The method according to claim 1, further comprising:
receiving, by the application server discovery network element, the identifier of the target service from a second terminal; and
obtaining, by the application server discovery network element, the address of the target application server locally based on an identifier of the second terminal and the identifier of the target service.

4. The method according to claim 1, wherein after obtaining, by the application server discovery network element, the address of the target application server, the method further comprises:
sending, by the application server discovery network element, the address of the target application server to the session management network element.

5. The method according to claim 4, wherein after sending, by the application server discovery network element, the address of the target application server to the session management network element, the method further comprises:
receiving, by the application server discovery network element, the identifier of the target service from a second terminal;
obtaining, by the application server discovery network element, the address of the target application server from the session management network element, based on the identifier of the target service; and
sending, by the application server discovery network element, the address of the target application server to the second terminal.

6. The method according to claim 1, wherein the first information or the address of the local domain name system server is determined based on locations of the plurality of terminals.

7. The method according to claim 1, further comprising:
receiving, by the application server discovery network element, identifiers of the plurality of terminals and the identifier of the target service from an application function network element.

8. The method according to claim 7, further comprising:
receiving, by the application server discovery network element, from the application function network element, one or more of: access time points, access locations, and access manners of accessing a same application server by the plurality of terminals when the plurality of terminals execute the target service.

9. A system, comprising:
a session management network element; and
an application server discovery network element, comprising at least one first processor configured to:
receive an identifier of a target service from a first terminal;
obtain an address of a target application server that needs to be accessed by a plurality of terminals to access the target service, wherein obtaining the address of the target application server comprises: obtaining, based on an identifier of the first terminal and the identifier of the target service, first information or an address of a local domain name system server from the session management network element, wherein the first information is used to determine an extension mechanism for a domain name system client subnet option, or the first information is an extension mechanism for a domain name system client subnet option; and
send the address of the target application server to the first terminal, wherein the plurality of terminals comprise the first terminal; and
wherein the session management network element comprises at least one second processor configured to send the first information or the address of the local domain name system server to the application server discovery network element.

10. The system according to claim 9, wherein the at least one first processor comprised in the application server discovery network element is further configured to:

send the address of the target application server to the session management network element;

receive the identifier of the target service from a second terminal;

obtain the address of the target application server from the session management network element based on the identifier of the target service; and send the address of the target application server to the second terminal; and wherein the at least one second processor comprised in the session management network element is further configured to:

receive the address of the target application server; and send the address of the target application server corresponding to the identifier of the target service received from the second terminal to the application server discovery network element.

11. The system according to claim 9, wherein the first information or the address of the local domain name system server is determined based on locations of the plurality of terminals.

12. An apparatus, comprising:

at least one processor coupled to at least one memory storing instructions, wherein the at least one processor is configured to execute the instructions to cause the apparatus to:

receive an identifier of a target service from a first terminal;

obtain, based on an identifier of the first terminal and the identifier of the target service, first information or an address of a local domain name system server corresponding to the identifier of the target service from a session management network element, wherein the first information is used to determine an extension mechanism for a domain name system client subnet option, or the first information is an extension mechanism for a domain name system client subnet option;

obtain an address of a target application server that needs to be accessed by a plurality of terminals to access the target service based on the first information or the address of the local domain name system server, wherein the plurality of terminals comprise the first terminal; and send the address of the target application server to the first terminal.

13. The apparatus according to claim 12, wherein the apparatus is further caused to:

store the address of the target application server that needs to be accessed by the plurality of terminals to access the target service.

14. The apparatus according to claim 12, wherein the at least one processor is configured to execute the instructions to cause the apparatus to:

receive the identifier of the target service from a second terminal; and obtain the address of the target application server locally based on the identifier of the second terminal and the identifier of the target service.

15. The apparatus according to claim 12, further comprising:

after obtaining the address of the target application server, sending the address of the target application server to the session management network element.

16. The apparatus according to claim 12, wherein the first information or the address of the local domain name system server is determined based on locations of the plurality of terminals.

17. The apparatus according to claim 12, wherein the at least one processor is configured to execute the instructions to further cause the apparatus to:

receive identifiers of the plurality of terminals and the identifier of the target service from an application function network element.

18. A non-transitory computer-readable storage medium storing instructions that, when executed by one or more processors, cause an apparatus to:

receive an identifier of a target service from a first terminal;

obtain, based on an identifier of the first terminal and the identifier of the target service, first information or an address of a local domain name system server corresponding to the identifier of the target service from a session management network element, wherein the first information is used to determine an extension mechanism for a domain name system client subnet option, or the first information is an extension mechanism for a domain name system client subnet option;

obtain an address of a target application server that is required to be accessed by a plurality of terminals to access the target service based on the first information or the address of the local domain name system server, wherein the plurality of terminals comprise the first terminal; and send the address of the target application server to the first terminal.

19. The non-transitory computer-readable storage medium according to claim 18, wherein the instructions, when executed by the one or more processors, further cause the apparatus to:

after obtaining the address of the target application server, send the address of the target application server to the session management network element;

receive the identifier of the target service from a second terminal;

obtain the address of the target application server from the session management network element, based on the identifier of the target service; and send the address of the target application server to the second terminal.

20. The non-transitory computer-readable storage medium according to claim 18, wherein the first information or the address of the local domain name system server is determined based on locations of the plurality of terminals.

* * * * *